United States Patent
Vandrak et al.

(10) Patent No.: US 10,495,344 B2
(45) Date of Patent: Dec. 3, 2019

(54) FORCED AIR HEATER INCLUDING MULTIPLE ON-BOARD SOURCES OF ELECTRIC ENERGY

(71) Applicant: Enerco Group, Inc., Cleveland, OH (US)

(72) Inventors: Brian S. Vandrak, Highland Heights, OH (US); Dennis O'Toole, Rocky River, OH (US)

(73) Assignee: Enerco Group, Inc., Cleveland, OH (US)

( * ) Notice: Subject to any disclaimer, the term of this patent is extended or adjusted under 35 U.S.C. 154(b) by 0 days.

(21) Appl. No.: 15/911,469

(22) Filed: Mar. 5, 2018

(65) Prior Publication Data

US 2018/0195761 A1      Jul. 12, 2018

Related U.S. Application Data

(63) Continuation of application No. 14/524,553, filed on Oct. 27, 2014, now Pat. No. 9,927,144, which is a
(Continued)

(51) Int. Cl.
*F24H 3/04*  (2006.01)
*F24H 3/02*  (2006.01)
(Continued)

(52) U.S. Cl.
CPC ........... *F24H 3/0488* (2013.01); *F24H 3/025* (2013.01); *F24H 9/02* (2013.01); *F24H 9/06* (2013.01);
(Continued)

(58) Field of Classification Search
None
See application file for complete search history.

(56) References Cited

U.S. PATENT DOCUMENTS

| 2,396,657 A | 3/1946 | Holthouse |
| 2,498,362 A | 2/1950 | De Lancey |
(Continued)

FOREIGN PATENT DOCUMENTS

| DE | 19821830 A1 | 11/1998 |
| EP | 1085275 A2 | 3/2001 |
(Continued)

OTHER PUBLICATIONS

Theory of Operation, webpages from www.desatech.com.
(Continued)

*Primary Examiner* — Avinash A Savani
*Assistant Examiner* — Martha M Becton
(74) *Attorney, Agent, or Firm* — Tucker Ellis LLP; Michael G. Craig; Heather M. Barnes

(57) ABSTRACT

One or more techniques and/or systems are disclosed for a heating device may comprise a control assembly having a self-contained, on board power supply. A control unit may control the operation of the heater and the power supply may comprise a first power source in electrical communication with the control unit, wherein the control unit controls the operation of the first power source to selectively supply electrical power to at least a portion of the heating device; and, a second power source in electrical communication with the control unit, wherein the control unit controls the operation of the second power source to selectively supply electrical power to at least a portion of the heating device.

13 Claims, 16 Drawing Sheets

Related U.S. Application Data continuation of application No. 13/085,979, filed on Apr. 13, 2011, now Pat. No. 8,893,706, which is a continuation-in-part of application No. 11/954,704, filed on Dec. 12, 2007, now Pat. No. 8,068,724.

(60) Provisional application No. 60/874,427, filed on Dec. 12, 2006, provisional application No. 61/323,997, filed on Apr. 14, 2010.

(51) Int. Cl.
*H02J 7/00* (2006.01)
*F24H 9/02* (2006.01)
*F24H 9/06* (2006.01)
*F24H 9/20* (2006.01)

(52) U.S. Cl.
CPC .......... *F24H 9/2085* (2013.01); *H02J 7/0068* (2013.01); *F24H 3/0417* (2013.01); *Y02B 30/28* (2013.01)

(56) References Cited

U.S. PATENT DOCUMENTS

| | | | | |
|---|---|---|---|---|
| 3,164,146 A * | 1/1965 | Friedl | ............... | B60H 1/2212 |
| | | | | 126/116 R |
| 3,211,439 A * | 10/1965 | Fahlberg | ............... | F23C 99/00 |
| | | | | 432/223 |
| 3,462,133 A * | 8/1969 | Brock | ............... | F24H 3/0488 |
| | | | | 126/110 R |
| 3,883,290 A * | 5/1975 | Windelbandt | ........ | F24H 3/0488 |
| | | | | 431/168 |
| 4,201,544 A | 5/1980 | Briggs et al. | | |
| 4,313,417 A | 2/1982 | Briggs et al. | | |
| 4,340,362 A | 7/1982 | Chalupdky et al. | | |
| 4,443,187 A | 4/1984 | Shaftner et al. | | |
| 4,635,382 A * | 1/1987 | Bourdeau | ............... | A45D 20/06 |
| | | | | 126/401 |
| 4,640,680 A * | 2/1987 | Schilling | ............... | F23D 14/64 |
| | | | | 431/347 |
| 4,835,410 A * | 5/1989 | Bhagwat | ............... | B25F 5/00 |
| | | | | 307/64 |
| 4,850,853 A | 7/1989 | Gruber et al. | | |
| 4,906,178 A * | 3/1990 | Goldstein | ............... | F23N 1/022 |
| | | | | 122/14.21 |
| 5,012,070 A | 4/1991 | Reed | | |
| 5,014,371 A | 5/1991 | Heel | | |
| 5,052,367 A * | 10/1991 | Beavers | ............... | F24H 3/105 |
| | | | | 126/110 B |
| 5,095,921 A * | 3/1992 | Losee | ............... | A24F 47/008 |
| | | | | 128/200.19 |
| 5,115,116 A | 5/1992 | Reed | | |
| D330,756 S | 11/1992 | Davies et al. | | |
| 5,183,998 A | 2/1993 | Hoffman et al. | | |
| 5,187,422 A * | 2/1993 | Izenbaard | ............... | H02J 7/0006 |
| | | | | 320/110 |
| 5,337,729 A | 8/1994 | Oman | | |
| 5,509,604 A * | 4/1996 | Chung | ............... | F02B 67/00 |
| | | | | 237/12.1 |
| 5,533,892 A | 7/1996 | Long | | |
| 5,540,213 A | 7/1996 | Shell et al. | | |
| 5,803,357 A * | 9/1998 | Lakin | ............... | G01K 1/026 |
| | | | | 236/78 B |
| 5,848,585 A | 12/1998 | Long et al. | | |
| 5,865,618 A * | 2/1999 | Hiebert | ............... | F23C 7/008 |
| | | | | 126/104 A |
| 6,142,141 A * | 11/2000 | Long | ............... | F24H 3/0488 |
| | | | | 126/110 B |
| 6,277,522 B1 | 8/2001 | Omaru et al. | | |
| 6,307,142 B1 * | 10/2001 | Allen | ............... | H01L 35/02 |
| | | | | 136/205 |
| 6,340,298 B1 | 1/2002 | Vandrak et al. | | |
| 6,460,626 B2 * | 10/2002 | Carrier | ............... | B25F 5/02 |
| | | | | 173/1 |
| 6,627,345 B1 * | 9/2003 | Zemlok | ............... | H01M 2/1055 |
| | | | | 429/158 |
| 6,648,635 B2 | 11/2003 | Vandrak et al. | | |
| 6,843,244 B2 | 1/2005 | McCalley et al. | | |
| 6,884,065 B2 | 4/2005 | Vandrak et al. | | |
| 6,911,804 B2 * | 6/2005 | Mori | ............... | G06F 1/263 |
| | | | | 320/132 |
| 6,967,565 B2 * | 11/2005 | Lingemann | ............ | G05B 15/02 |
| | | | | 340/12.23 |
| 7,300,278 B2 | 11/2007 | Vandrak et al. | | |
| 7,600,998 B1 * | 10/2009 | Pitchford | ............... | F24H 9/02 |
| | | | | 126/110 B |
| 7,719,143 B2 | 5/2010 | Powell | | |
| 7,741,815 B2 | 6/2010 | Cassidy | | |
| 7,823,579 B2 | 11/2010 | Vandrak et al. | | |
| 7,997,004 B1 * | 8/2011 | Adrian | ............... | E04H 15/12 |
| | | | | 126/109 |
| 8,068,724 B2 | 11/2011 | Vandrak et al. | | |
| 8,146,583 B1 | 4/2012 | Lee, Jr. | | |
| 2002/0132202 A1 * | 9/2002 | Clifford | ............... | F24H 1/205 |
| | | | | 431/264 |
| 2003/0056390 A1 * | 3/2003 | Adrian | ............... | F24H 1/06 |
| | | | | 34/79 |
| 2004/0106080 A1 | 6/2004 | Vandrak et al. | | |
| 2005/0233219 A1 | 10/2005 | Gordz et al. | | |
| 2005/0233220 A1 | 10/2005 | Gordz et al. | | |
| 2005/0253560 A1 * | 11/2005 | Popescu-Stanesti | ...... | H02J 1/08 |
| | | | | 320/138 |
| 2005/0257786 A1 | 11/2005 | Vandrak et al. | | |
| 2006/0236557 A1 * | 10/2006 | Bousfield | ............... | A45D 20/06 |
| | | | | 34/96 |
| 2006/0245744 A1 | 11/2006 | Ju | | |
| 2007/0105010 A1 * | 5/2007 | Cassidy | ............... | A61M 5/44 |
| | | | | 429/90 |
| 2007/0235017 A1 * | 10/2007 | Fitch | ............... | F24D 5/00 |
| | | | | 126/110 B |
| 2008/0260364 A1 | 10/2008 | Vandrak et al. | | |
| 2010/0290765 A1 * | 11/2010 | Lee | ............... | F24H 3/0411 |
| | | | | 392/485 |
| 2011/0265779 A1 | 11/2011 | Vandrak et al. | | |

FOREIGN PATENT DOCUMENTS

| | | |
|---|---|---|
| GB | 841285 A | 7/1960 |
| WO | 0005540 A1 | 2/2000 |
| WO | 2002079700 A1 | 10/2002 |
| WO | 2007056202 A2 | 5/2007 |

OTHER PUBLICATIONS

PCT International Search Report and Written Opinion from International Application No. PCT/US2011/032263, dated Mar. 19, 2013, 13 pages.

PCT International Preliminary Report on Patentability from International Application No. PCT/US2011/032263, dated Jan. 17, 2013, 16 pages.

EPO Communication pursuant to Article 94 (3) EPC from Application No. 11722944.3, dated Oct. 17, 2014, 9 pages.

RIDGID 18 volt hybrid forced air online sales page, printed Aug. 22, 2017, pdf.

RIDGID operators manual hybrid propane heater, dated Feb. 12, 2016, pdf.

* cited by examiner

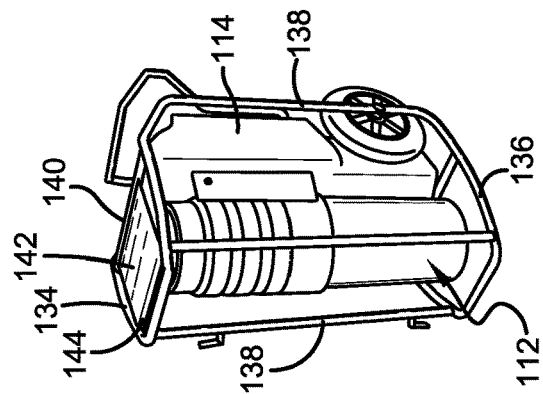
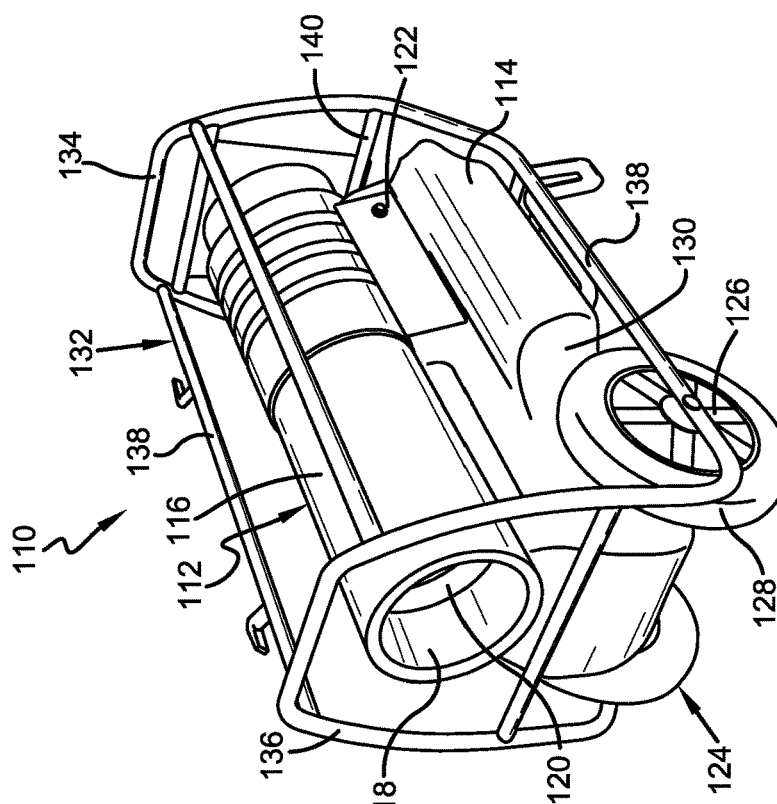
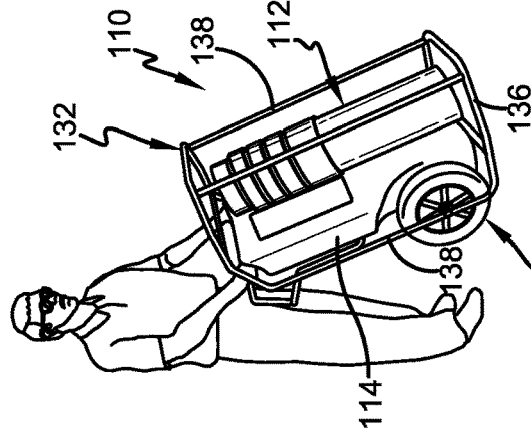

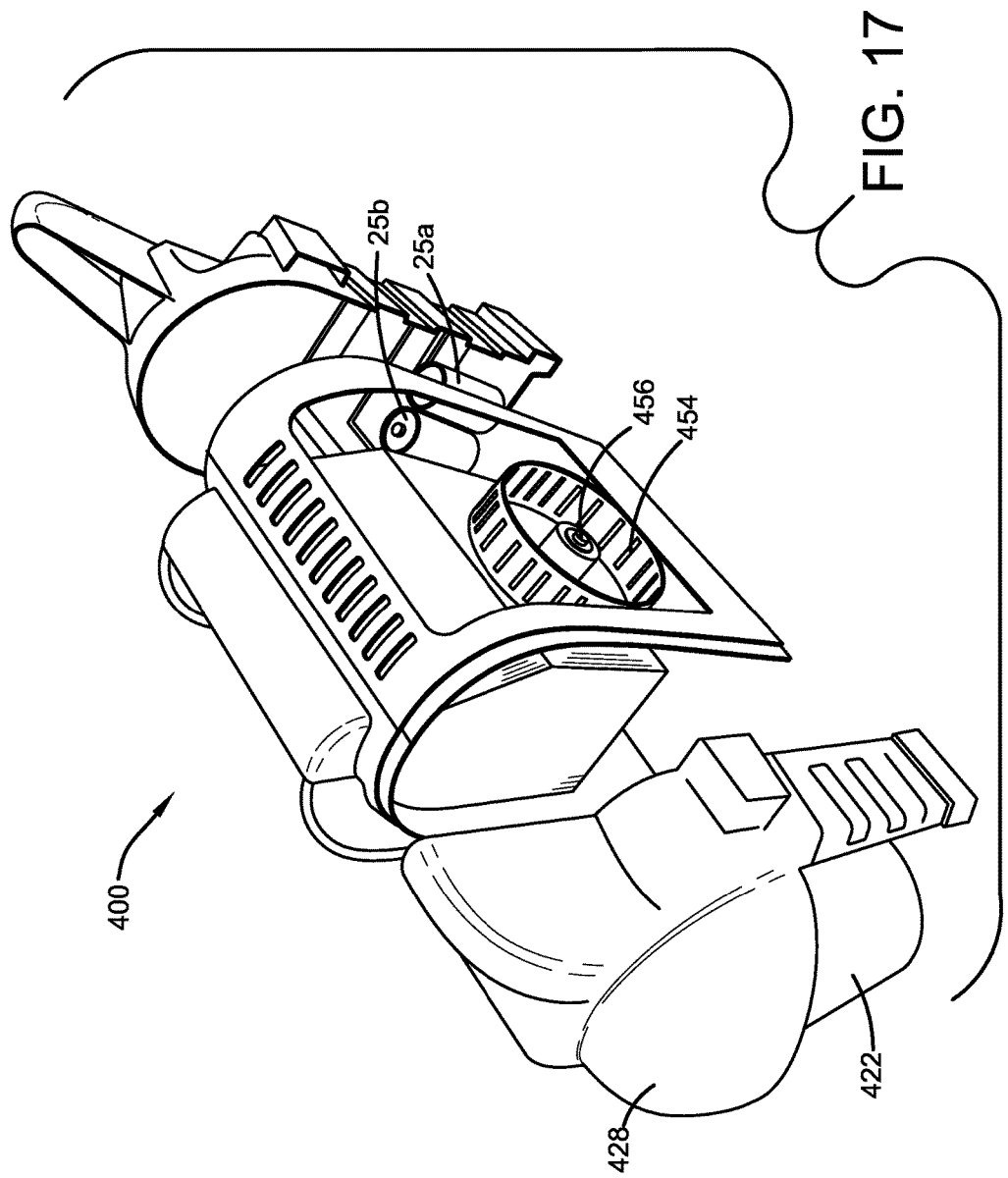

FORCED AIR HEATER INCLUDING MULTIPLE ON-BOARD SOURCES OF ELECTRIC ENERGY

CROSS-REFERENCE TO RELATED APPLICATIONS

This application is a continuation of, and claims priority to, a continuation application, U.S. Ser. No. 14/524,553, titled Forced Air Heater Including On-Board Source of Electric Energy, filed Oct. 27, 2014; which claims the benefit of, and is a continuation of, U.S. Ser. No. 13/085,979, titled Forced Air Heater Including On-Board Source of Electric Energy, filed Apr. 13, 2011, now U.S. Pat. No. 8,893,706; which claims the benefit of and is continuation in part of U.S. Ser. No. 11/954,704, titled Forced Air Heater Including On-Board Source of Electric Energy, filed Dec. 12, 2007, now U.S. Pat. No. 8,068,724; which claims the benefit of provisional application U.S. Ser. No. 60/874,427, titled Forced Air Heater Including On-Board Source of Electric Energy, filed Dec. 12, 2006; U.S. Ser. No. 13/085,979 further claims the benefit of U.S. Ser. No. 61/323,997, titled Forced Air Heater Including On-Board Source of Electric Energy, filed Apr. 14, 2010; all of which are incorporated herein by reference.

BACKGROUND

Fuel-fired portable heaters such as forced-air heaters find use in multiple environments. Typically, this type of heater includes a cylindrically-shaped housing with a combustion chamber disposed coaxially therein. A combustible fuel (e.g., liquid or gas fuel) stored in a proximate fuel storage can be mixed with air inside the combustion chamber where it is combusted, resulting in the generation of a flame. During combustion of the air/fuel mixture a fan blade is rotated by an electric motor to draw ambient air into the heater to be heated by the combustion of the air/fuel mixture. The heated air is expelled out of the heater by the continuous influx of air caused by the fan.

Forced-air heaters typically have a source of electric energy to energize the motor that rotates the fan blade and optionally to operate an ignition source that triggers combustion of the air/fuel mixture. The demand for electrical energy created by operation of the fan and other electrical components of forced-air heaters usually means that the heater is connected to an external electricity source, such as a conventional wall outlet supplying alternating current ("AC") electrical energy generated by a public utility. In remote environments, the use of a portable generator to supply the electrical energy is often utilized.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, a heating device that can store electricity locally, thereby mitigating a need for an external source of electricity. Further, the heating device may be configured to generate electricity locally, and store the generated electricity locally, such as in a rechargeable power source disposed in the heating device. Additionally, a heating device may be devised that can be stored in an alternate orientation, for example, other than the operational orientation.

In one implementation, a heating device can comprises a housing assembly that comprises a combustion region and an interior chamber that may be disposed adjacent to the combustion region. In this implementation, the heating device can also comprise a control assembly. The control assembly may comprise a control unit that is configured to control at least a portion of the operation of the heating device. Further, the control assembly can comprise a power supply. The power supply can comprise a first power supply that is in electrical communication with the control unit. In this implementation, the control unit can be configured to control an operation of the first power source that selectively supplies electrical power to at least a portion of the heating device, and the first power source can comprise a selectively removable rechargeable battery. Additionally, the power supply can comprise a second power source in electrical communication with the control unit. In this implementation, the control unit can be configured to control an operation of the second power source that selectively supplies electrical power to at least a portion of the heating device. The heating device may also comprise a recharging unit that is configured to be selectively placed in electrical communication with the rechargeable battery resulting in recharging of the rechargeable battery.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein:

FIG. 8 is a view of a forced-air heater in an orientation in which it is to be fired according to an embodiment of the present invention;

FIG. 9 is a view of a forced-air heater in an orientation in which it can optionally be transported with minimal leakage of a liquid fuel from the heater's fuel tank according to an embodiment of the present invention;

FIG. 10 is a view of a forced-air heater in a substantially-vertical orientation in which it can optionally be stored with minimal leakage of a liquid fuel from the heater's fuel tank according to an embodiment of the present invention;

FIG. 17 is a top perspective view of a radiant heater including a motor and fan blades positioned in the housing assembly and operated by an onboard power supply in accordance with an embodiment of the present invention;

DETAILED DESCRIPTION

Figure 1:
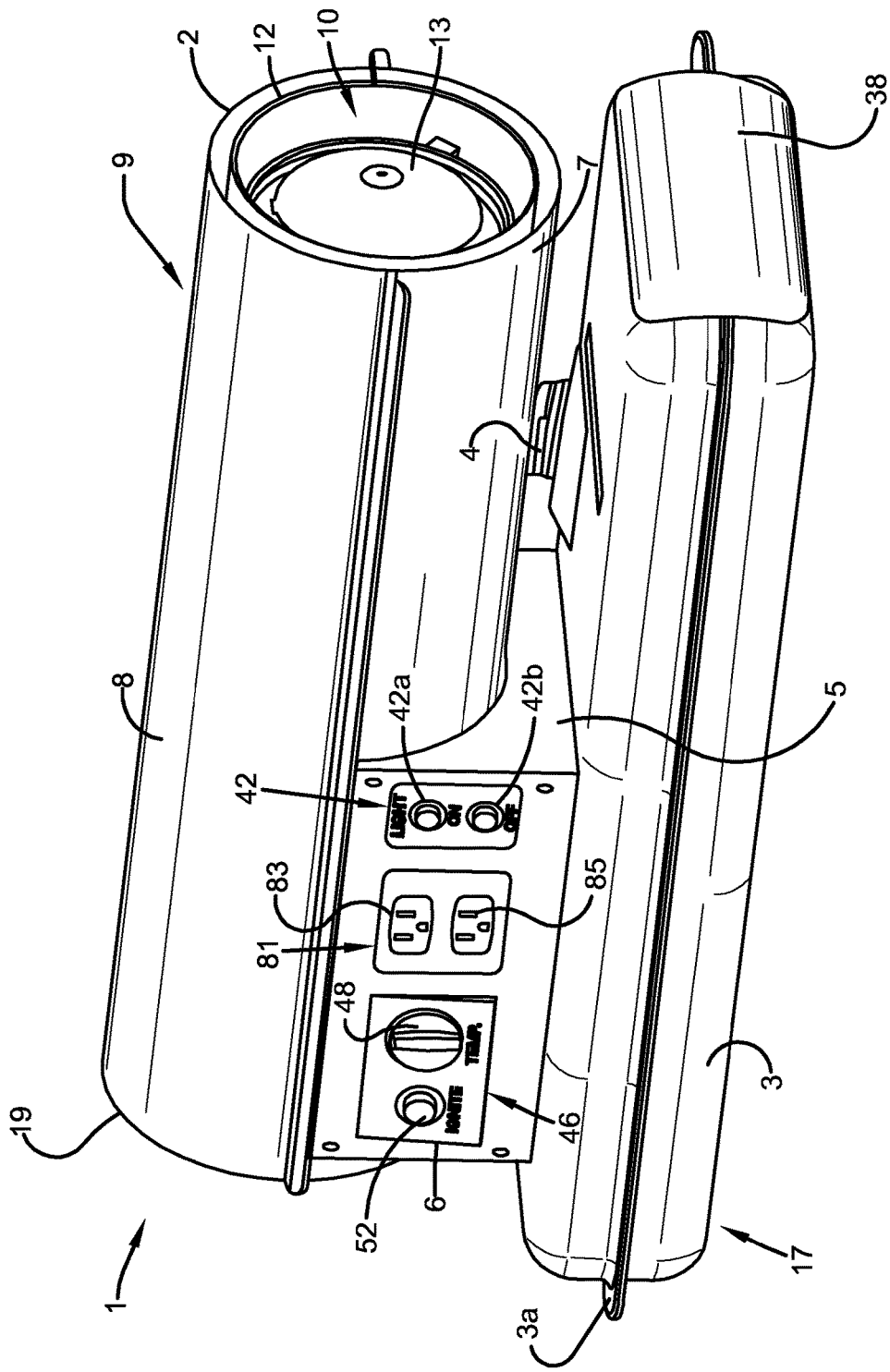
FIG. 1 is a perspective view of a forced-air heater including an onboard power supply, an outlet, and a light exposed to an exterior of the forced-air heater in accordance with an embodiment of the present invention.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices may be shown in block diagram form in order to facilitate describing the claimed subject matter.

Referring now to the drawings wherein the showings are for purposes of illustrating embodiments of the invention only and not for purposes of limiting the same, the FIGURES show a heating device 1 having a self-contained, on-board power supply 24. The heating device 1 may comprise a portable heating device suitable for use in recreational enclosures, temporary work enclosures, as well as other environments wherein a portable supply of heat is desired or useful. Although a specific type or types of heating devices may be described, the type of heating device utilizing the on-board power supply 24 is not intended to be a limitation of the invention. The on-board power supply 24 may be utilized with any type of heating device chosen with sound judgment by a person of ordinary skill in the art.

With reference now to FIGS. 1-5, according to one embodiment, the heating device 1 may comprise a forced-air heater having a housing assembly 9, a fuel assembly 17, and a control assembly 22. The housing assembly 9 may provide a stable base for the heating device 1 and may provide a storage area for one or more power sources (e.g., a first power source and/or a second power source), a recharging unit, fuel lines or hoses, or power cords as further described below. In one embodiment, the housing assembly 9 may comprise a base adjustment mechanism 47 that allows for variation in the direction (i.e., allows for the rotational movement of the housing assembly 9), height and/or pitch of the heating device 1. The housing assembly 9 may comprise an outer cylinder 11, an inner cylinder 12, a support 5, a motor 15, and fan blades 18. The outer cylinder 11 may be designed to at least partially protect the interior components of the heating device 1 and may comprise a generally cylindrical shell that is positioned substantially around the inner cylinder 12. The outer cylinder 11 may comprise a lower housing portion 7 and an upper housing portion 8. In one embodiment, the upper housing portion 8 and lower housing portion 7 may comprise separate portions that are fixedly attached to form a generally cylindrical shell. In another embodiment, the outer cylinder 11 may comprise a singular, substantially cylindrical shell that comprises the upper housing portion 8 and lower housing portion 7. The inner cylinder 12 may also comprise a generally cylindrical shell having a first or air intake end 19 and a second or discharge end 2. The inner cylinder 12 may be positioned substantially coaxially within the outer cylinder 11 to define an annular space 71 therebetween. The annular space 71, shown in FIG. 3, may comprise a cavity defined by or formed between the outer cylinder 11 and the inner cylinder 12 and may result in a reduction of the amount of heat that is transferred therebetween relative to the amount of heat that would be so transferred if the outer cylinder 11 contacted the inner cylinder 12. In one embodiment, the housing assembly 9 may comprise an insulator, not shown, positioned at least partially within the annular space 71. The insulator, not shown, may reduce the amount of air necessary to flow through the annual space 71 to cool the outer cylinder 11. In another embodiment, the housing assembly 9 may be designed to reduce the required air flow to the burner assembly 23 thereby resulting in a reduction in the power required to operate the heating device 1.

With continued reference now to FIGS. 1-5, according to one embodiment, the inner cylinder 12 may be secured to the outer cylinder 11 by a plurality of evenly spaced brackets disposed about the periphery of the ends of the inner cylinder 12. The brackets may be secured by conventional fasteners such as screws or the like to the inner cylinder 12 and to corresponding locations on the outer cylinder 11. At least a portion of the recess or area defined by the inner cylinder 12 may comprise a combustion region 10 as further described below. In one embodiment, a semi-spherical shaped baffle 13 may be provided adjacent to the discharge end 2 of the inner cylinder 12 and an inner cylinder assembly 33 may be provided adjacent to the air intake end 19. An air intake guard 14 may be attached to the end of the outer cylinder 11 adjacent to the air intake end 19 of the inner cylinder 12. The air intake guard 14 may prevent large objects, which can damage fan blades 18 or block the air passages, from entering the housing assembly 9. The intake guard 14 may also protect the operator from injury resulting from coming into contact with rotating fan blades 18. In one embodiment, the housing assembly 9 may comprise a safety grill 41 that substantially performs the functions of the air intake guard 14 and the inner cylinder assembly 33. The safety grill 41 may substantially cover the air intake end 19 and fan blades 18 thereby allowing the housing assembly 9 to utilize a single grill or guard unit. In one embodiment, a handle 35, shown in FIGS. 3 and 4, may be attached to the upper housing portion 8 to assist the operator in transporting the heating device 1.

With continued reference now to FIGS. 1-5, according to one embodiment, the support 5 may be attached to the housing assembly 9. In one embodiment, the support 5 may act as a base for the heating device 1, shown in FIG. 4. In another embodiment, the support 5 may be attached to the housing assembly 9 and the fuel tank 3, shown in FIGS. 1-3. The support 5 may be secured to or otherwise formed adjacent to the top surface of the fuel tank 3 by spot welding, brazing, or the like, and may support the housing assembly 9. The support 5 may include at least one adjustable panel 6 that can be adjusted by an operator to form or reveal a support aperture 30. The support aperture 30 may allow the operator to gain access into an interior chamber 21 defined by the support 5. The adjustable panel 6 may be secured to the support 5 by any type of fastener that permits adjustment of the adjustable panel 6 to allow access into the interior chamber 21 chosen with sound judgment by a person of ordinary skill in the art. Examples of such fasteners include a hinge, locking screw, latch, sliding mechanism, and the like. The interior chamber 21 may be suitable to house or enclose various components of the heating device 1, such as the control unit 27, the power supply 24 (FIG. 3), control and ignition circuitry, electrical wiring, air and fuel hoses, and the like. Each of such components can be serviced, replaced or accessed through the support aperture 30 in the support 5. In one embodiment, the support 5 may protect a valve and thermocouple assembly 76 from damage, in the embodiments where the valve and thermocouple assembly 76 (FIG. 5) is necessary. The valve and thermocouple assembly 76 may be necessary in embodiments wherein a gas supply is used to at least partially provide power to the heating device 1.

With continued reference now to FIGS. 1-5, in one embodiment, adjacent to the air intake end 19 of the heating device 1 and positioned between the intake guard 14 and the inner cylinder assembly 33, the motor 15 may be supported by means of a bracket 32 that extends between the upper housing portion 8 and lower housing portion 7 of the outer cylinder 11. The motor 15 may comprise an AC or DC motor utilized to cause the rotation of fan blades 18. In one embodiment, the motor 15 may comprise a DC motor that at least partially allows the heating device 1 to achieve a reduced sound level during operation of the heating device 1. The rotation of fan blades 18 may cause ambient air to be drawn through the intake guard 14 and into the housing assembly 9. A portion of the air drawn into the housing assembly 9 passes through the annular space 71 which surrounds the inner cylinder 12. The passing of air through the annular space 71 may provide cooling air which acts to at least partially insulate the outer cylinder 11 from the inner cylinder 12. Another portion of the air drawn into the housing assembly 9 passes through holes or apertures formed in the inner cylinder assembly 33 and into the combustion region 10. The air passing through the inner cylinder assembly 33 may comprise a moving forced air that is heated by the combustion of the air/fuel mixture as described below and which exits the housing assembly 9 as heated air through the discharge end 2 and passing through the baffle 13 thereby causing heated air to be circulated into the area desired to be heated. In one embodiment, a drive shaft 16 may be operatively connected between the motor 15 and fan blades 18. The drive shaft 16 may extend from and may be rotationally driven by the motor 15 and an end of the drive shaft 16 may be coupled to fan blades 18. The operation of the motor 15 may cause the rotation of the drive shaft 16 thereby resulting in the rotation of fan blades 18 which may cause ambient air to be drawn in the direction of arrows 34 through the air intake end 19 as described above.

Figure 2:
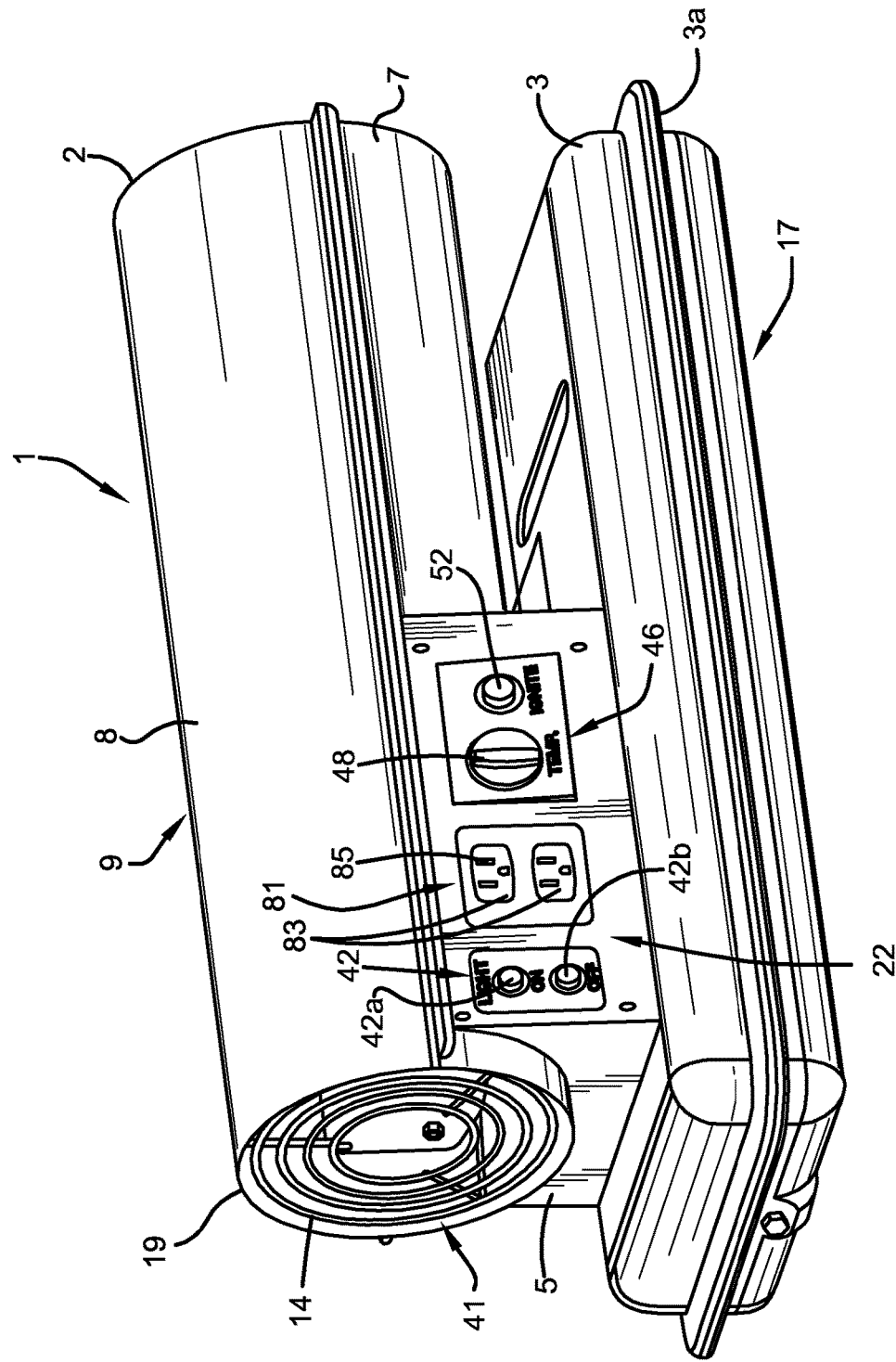
FIG. 2 is a perspective view of a forced-air heater including an onboard power supply, an outlet, and a light exposed to an exterior of the forced-air heater in accordance with an embodiment of the present invention.
Figure 3:
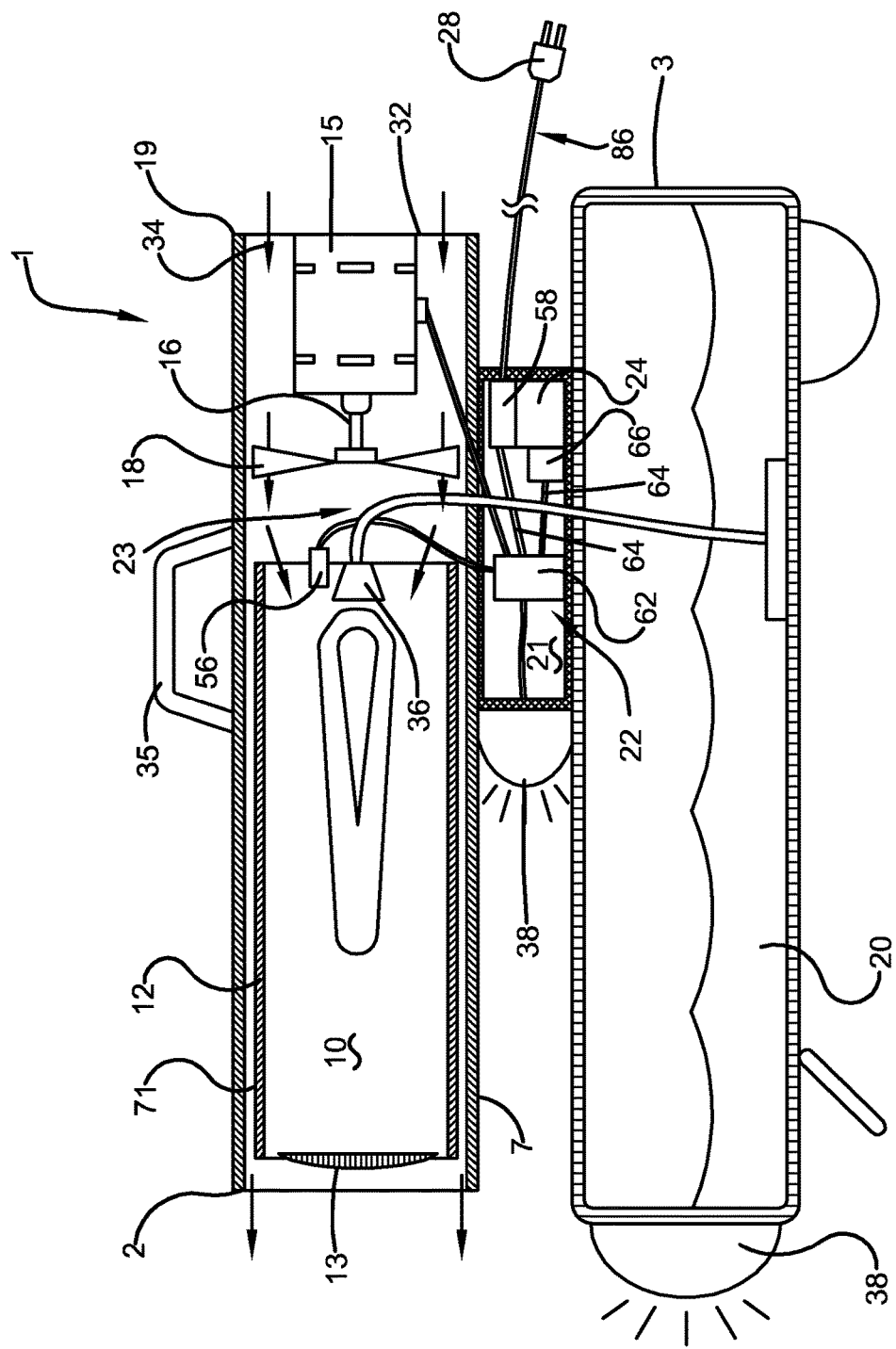
FIG. 3 is a cutaway view of a forced-air heater having an onboard power supply in accordance with an embodiment of the present invention.
Figure 4:
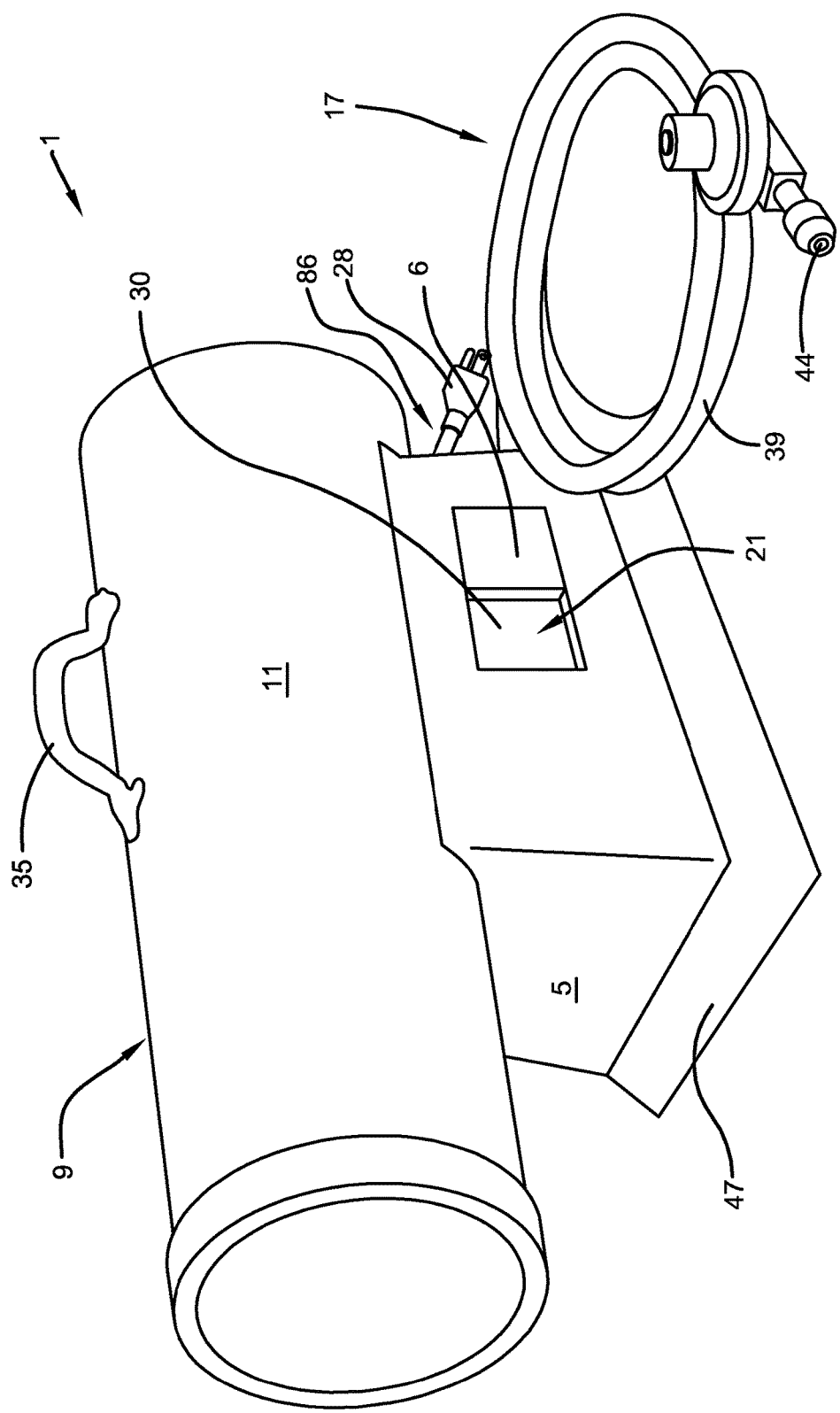
FIG. 4 is a perspective view of a forced-air heater including an onboard power supply in accordance with an embodiment of the present invention.

With continued reference to FIGS. 1-5, according to one embodiment, the fuel assembly 17 may comprise a fuel tank 3 and a supply assembly 36. The fuel tank 3 may be suitable for containing a liquid fuel 20, as shown in FIG. 3, such as, for example, a suitable grade fuel oil, kerosene, gasoline and the like. The liquid fuel 20 may be utilized to supply a portion of the power required for operation of the heating device 1. The fuel tank 3 can optionally be formed as a singular molded unit or from two opposing rectangular trays arranged with their openings facing each other. For embodiments including a fuel tank 3 formed from two opposing trays, the trays may be joined together by seam welding or otherwise coupling flanges 3a extending around the perimeter of the fuel tank 3. A removable filler cap 4 may cover a fueling aperture (not shown) formed in a surface of the fuel tank 3 through which the liquid fuel 20 may be added. In another embodiment, the fuel tank 3 may comprise a tank or cylinder, not shown, suitable for containing propane or similar fuels. In one embodiment, the housing assembly 9 may allow for the mounting of the fuel tank 3 thereby increasing the ease at which the fuel tank 3, including the fuel contained therein, and the heating device 1 may be transported. In another embodiment, the fuel tank 3 may comprise one or two one-pound cylinders operatively connected to the heating device 1. The cylinders may be moveable from a first use position into a second position in which the cylinder can be replaced. This mode of operation in one embodiment may be affected through the incorporation of a braided gas hose which employs a sliding mechanism in which the user physically pulls the cylinder from its use position inside the housing assembly 9, to a replace position outside of the housing assembly 9 via telescoping or sliding movement of rails. In another embodiment, this mode of operation may be effected by the fixed incorporation of the swivel body into a door or adjustable panel 6 of the housing assembly 9 within which is positioned the cylinder, thereby requiring the user to open the door or adjustable panel 6 with cylinder attached for replacement of the cylinder. In another embodiment, this mode of operation may be effected by removal of the cylinder from within the interior chamber 21 which is attached by a clamp and bracket within the interior chamber 21 while in yet another embodiment, this mode of operation may be effected by pivotal movement of a swivel body within a pair of U-shaped clamps having a pivot rod interposed therebetween. In yet another embodiment, this mode of operation may be effected by a swivel weighted clip which requires tilting of the heating device 1 prior to removal of the spent cylinder. The cylinder may connect to a swivel body which connects to an associated regulator (for decreasing the pressure of the exit port gas) of the supply assembly 36.

With continued reference to FIGS. 1-5, according one embodiment, the supply assembly 36 may comprise a burner assembly 23 and an ignition system 56. The burner assembly 23 may be adapted to cause the liquid fuel 20 to be communicated from the fuel tank 3 wherein it can be subsequently atomized and combined with air or other oxygen source in the combustion region 10, where it is then combusted to generate the thermal energy for heating air being forced through the heating device 1. In one embodiment, the burner assembly 23 may allow the liquid fuel 20 to be pulled up or communicated from the fuel tank 3 through a fuel conduit 39 and into the burner assembly 23. The fuel conduit 39 may comprise a connection valve 44 for operatively connecting the fuel conduit 39 and the fuel tank 3. In one embodiment, the connection valve 44 may comprise an acme-type connection. The fuel conduit 39 may comprise an integrated hose assembly, a separate hose assembly, or a hose-less direct connect assembly. The fuel conduit 39 may comprise any type of conduit suitable for communicating fuel from the fuel tank 3 chosen with sound judgment by a person of ordinary skill in the art. In another embodiment, the burner assembly 23 may be adapted to allow fuel to be communicated from a tank or cylinder, not shown, suitable for containing the liquid fuel 20, such as, for example, a propane tank. The fuel conduit 39 may allow the fuel to be supplied to a burner venturi 45 where it is mixed with ambient air. The supply assembly 36 may comprise any type of supply assembly designed to transmit an atomized air/fuel mixture into the combustion region 10 chosen with sound judgment by a person of ordinary skill in the art and is not intended to be a limitation of the present invention.

With continued reference to FIGS. 1-5, a portion of the burner assembly 23 may extend through an opening located centrally in the inner cylinder assembly 33 to provide the un-ignited air/fuel mixture at the end of the burner assembly 23 wherein the un-ignited air/fuel mixture is urged towards the inner cylinder assembly 33. The inner cylinder assembly 33 may be designed to divert the air/fuel mixture radially into the combustion region 10 as the air/fuel mixture exits the burner assembly 23 wherein the un-ignited air/fuel mixture may then be ignited and burned. In one embodiment, the burner assembly 23 may comprise a design which reduces the required air flow thereby reducing the power requirements of the heating device 1. In one embodiment, the burner assembly 23 may comprise a design that achieves a reduced sound level resulting from the operation of the heating device 1.

With continued reference to FIGS. 1-5, initially, the air/fuel mixture may be ignited by the ignition system 56. The ignition system 56 may be designed to ignite or cause the initial combustion of the air/fuel mixture within the combustion region 10. In one embodiment, the ignition system 56 may be operatively connected to the control assembly 22 and may comprise one or more components powered by the power supply 24.

Figure 6:
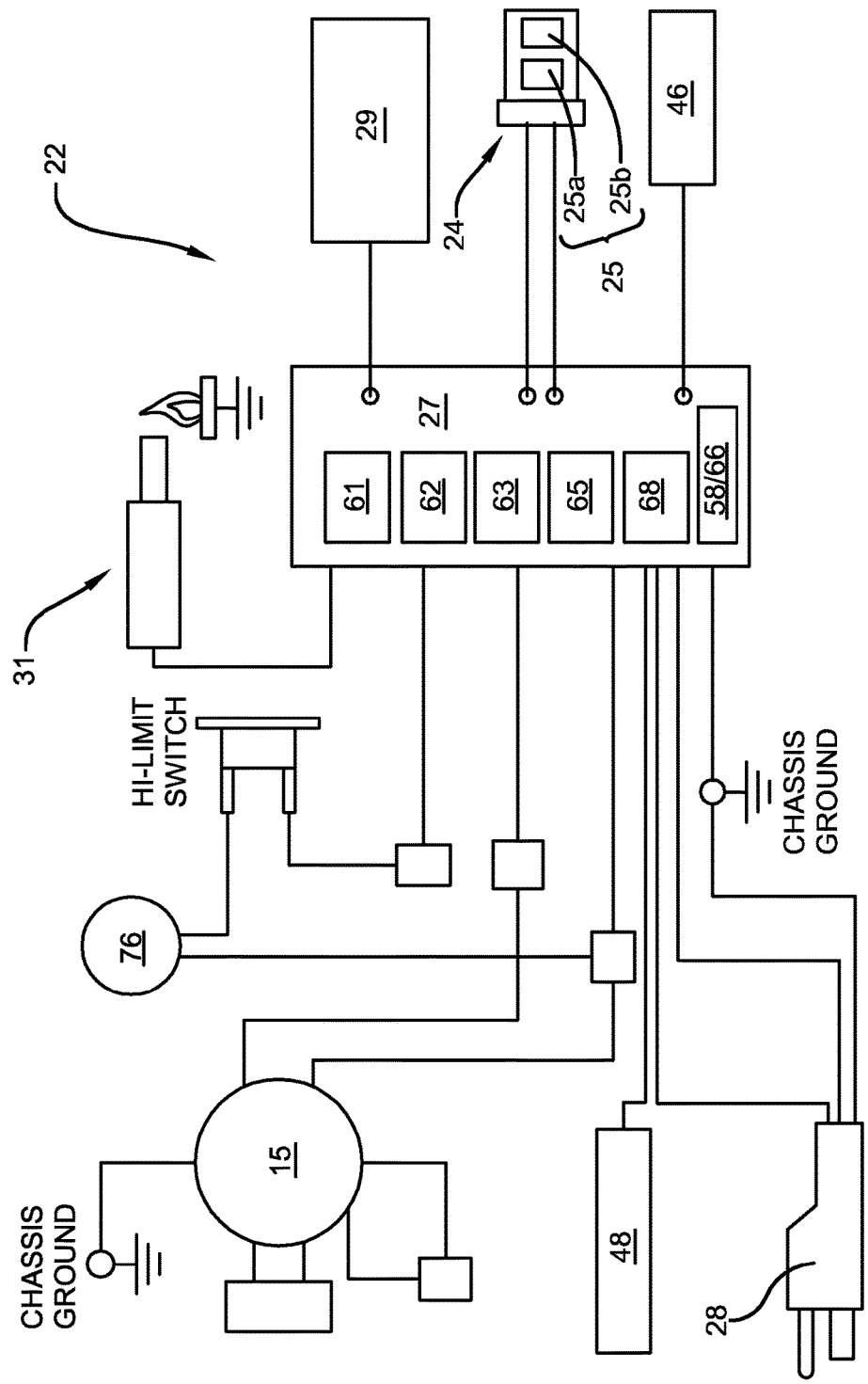
FIG. 6 is an illustrative view of a forced-air heater including an onboard power supply in accordance with an embodiment of the present invention.

With reference now to FIG. 6, in one embodiment, the control assembly 22 may comprise the power supply 24, a control unit 27, and a control panel 46. The power supply 24 may comprise the sole or primary source of power for operation of the heating device 1 or one or more components thereof (e.g., a first component and a second component of the heating device 1). The power supply 24 may comprise the sole or primary source of power for the heating device 1 for a limited or an extended period of time. The power supply 24 may enable the use of an external power source, described below, such that the power supply 24 may be utilized as the primary source of power or as a back-up source of power when the primary source, for example, AC power supply, and/or gas supply, fails or is exhausted. The power supply 24 can supply electric energy, at least temporarily, to operate one or more electric components of the heating device 1 while the heating device 1 is generating thermal energy for heating its ambient environment.

With continued reference to FIG. 6, in one embodiment, the power supply 24 may comprise a self-contained, on-board power supply that comprises a power cord assembly 86 and/or one or more portable power sources 25 suitable for supplying electric energy, at least temporarily, to operate at least a portion of the heating device 1. The power cord assembly 86 may allow AC and/or DC power from an external source, such as, for example, a conventional wall outlet or a vehicle battery, to be used for a portion of the power utilized for operating the heating device 1. The power supply 24 may allow the selective use of an external source and/or the portable power source 25 to be used as an alternative or supplemental energy source providing at least a portion of the operating or accessory power for the heating device 1. In other embodiments, the power supply 24 may allow the portable power source 25 to be utilized simultaneously with a second power source, such as, for example, gas or AC power source, wherein second power source may supply power for the heating operations of the heating device 1 and the portable power source 25 may supply power to any available peripheral devices of the heating device 1, such as, for example, a fan function, light or fuel pump. Other simultaneous uses enabled by the power supply 24 wherein the portable power source 25 can be utilized with a second power source (i.e., gas or AC power supply) include embodiments wherein the power supply 24 enables the selective powering of at least one function of the heating device 1 by the portable power source 25 and enables the second power source to power at least one other function of the heating device 1. Additionally, the power supply 24 may enable the portable power source 25 to power the heating device 1 consecutively or sporadically with the second power source to conserve the fuel, or prevent indoor air pollution.

With reference now to FIGS. 1-6, in one embodiment, the portable power source 25 may be integrated into the housing assembly 9 and/or within the interior chamber 21 of the heating device 1. The portable power source 25 may be detachable from the physical structure of the heating device 1 or may be positioned on a physically separate structure from the heating device 1. In one embodiment, the portable power source 25 may comprise a rechargeable battery, such as, for example, a lithium ion battery, which is integrated fully or partially with the housing assembly 9. Examples of suitable portable energy sources include, but are not limited to, a battery, thermoelectric generator, fuel cell, ultra-capacitor, and any other type of portable energy source chosen with sound judgment by a person of ordinary skill in the art. An example of a suitable battery is the lithium secondary cell battery (also called a lithium ion battery), a cutaway view of which is shown schematically in FIG. 4. Details of such a battery are disclosed in United States Patent Publication No. U.S. 2005/0233219, published on Oct. 20, 2005, which is incorporated in its entirety herein by reference. Another example of a suitable power supply 24, such as a battery, is described in detail in United States Publication No. U.S. 2005/0233220, published on Oct. 20, 2005, which is also incorporated in its entirety herein by reference. This, or batteries with similar performance characteristics may be utilized to supply electric energy, at least temporarily, to one or more electric components of the heating device 1.

The aforementioned lithium ion examples of a suitable battery that can be used as the portable power source(s) of the power supply 24 may include a high-capacity lithium-containing positive electrode in electronic contact with a positive electrode current collector. A high-capacity negative electrode is in electronic contact with a negative electrode collector. The positive and negative collectors are in electrical contact with separate external circuits. A separator is positioned in ionic contact between with the cathode (positive terminal) and the anode (negative terminal), and an electrolyte is in ionic contact with the positive and negative electrodes. The slow discharge rates of the battery allow for extended shelf-life and extended use characteristics.

The total and relative area specific impedances for the positive and negative electrodes of such exemplary batteries are such that the negative electrode potential is above the potential of metallic lithium during charging at greater than or equal to 4C (4 times the rated capacity of the battery per hour). The current capacity per unit area of the positive and negative electrodes each are at least 3 mA-h/cm2 and the total area specific impedance for the cell is less than about 20 S2-cm2. The ratio of the area specific impedances of the positive electrode to the negative electrode is at least about ten.

Also, for the lithium ion batteries discussed in the examples above, the area specific impedance of the total cell is localized predominantly at the positive electrode. The charge capacity per unit area of the positive and negative electrodes each are preferably at least 0.75 mA-h/cm2, more preferably at least 1.0 mA-h/cm2, and most preferably at least 1.5 mA-h/cm2. The total area specific impedance for the cell is less than about 16 Ω-cm2, preferably less than about 14 Ω-cm2, and more preferably less than about 12 Ω-cm2, more preferably less than about 10 Ω-cm2, and most preferably less than or equal to about 3 Ω-cm2. The negative electrode has an area specific impedance of less than or equal to about 2.5 Ω-cm2, more preferably less than or equal to about 2.0 Ω-cm2, and most preferably less than or equal to about 1.5 Ω-cm2.

Examples of suitable materials for the positive electrode include a lithium transition metal phosphate including one or more of vanadium, chromium, manganese, iron, cobalt, and nickel. Examples of suitable negative electrode materials include carbon, such as graphitic carbon. The carbon is selected from the group consisting of graphite, spheroidal graphite, mesocarbon microbeads and carbon fibers.

Figure 7:
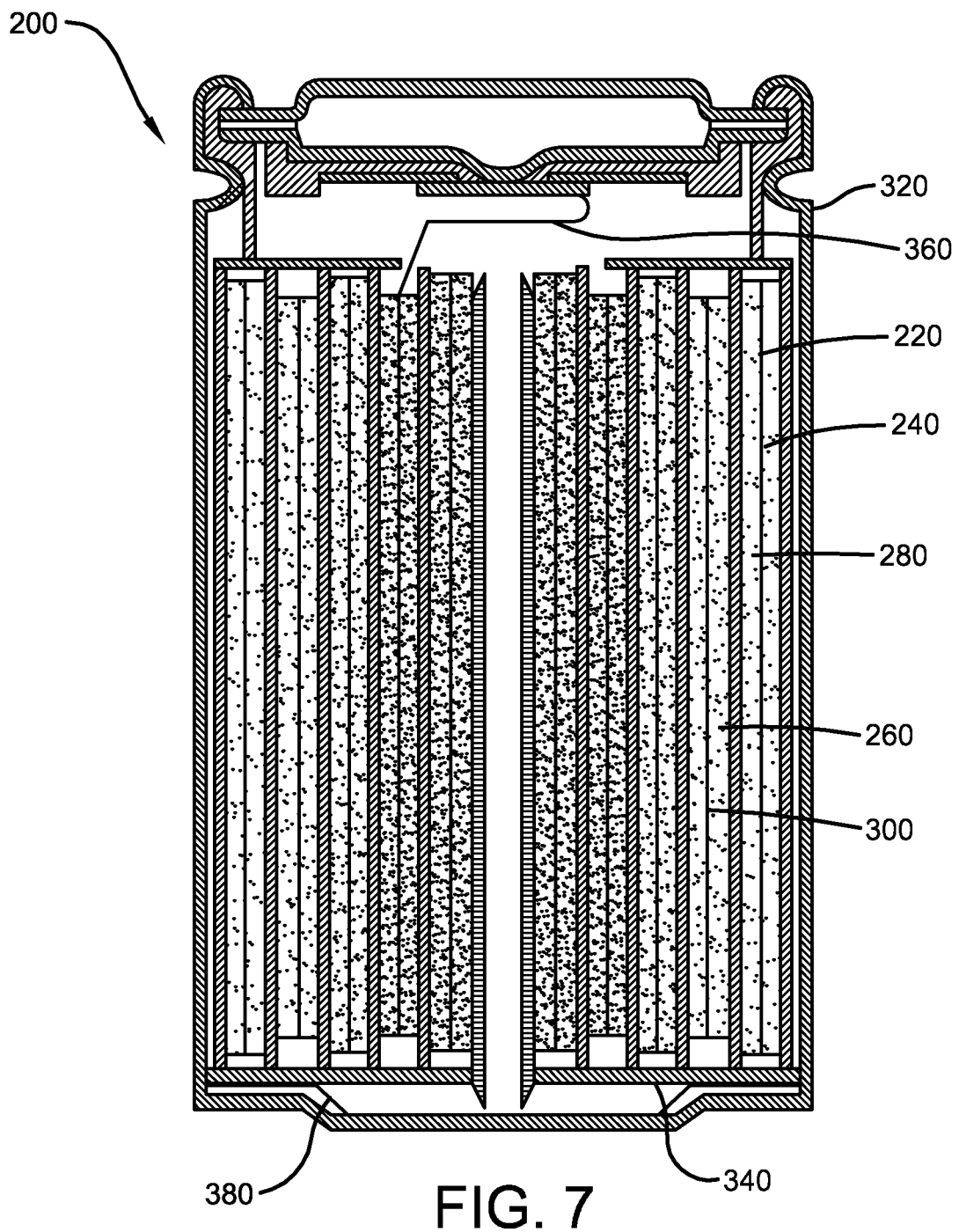
FIG. 7 is a cutaway view of a battery that can optionally be utilized as a portable power source for a forced-air heater in accordance with the present invention.

Embodiments of the batteries discussed above can optionally include a battery element having an elongated cathode and an elongated anode, which are separated by two layers of an elongated micro-porous separator which are tightly wound together and placed in a battery can. An example of a typical spiral electrode secondary cell is shown in FIG. 7, the details of which are discussed in U.S. Patent Publication 2005/0233219 and U.S. Pat. No. 6,277,522, both of which are incorporated in their entirety herein by reference. The secondary cell 200 includes a double layer of anode material 220 coated onto both sides of an anode collector 240, a separator 260 and a double layer of cathode material 280 coated onto both sides of cathode collector 300 that have been stacked in this order and wound to make a spiral form. The spirally wound cell is inserted into a battery can 320 and insulating plates 340 are disposed at upper and lower surfaces of the spirally wound cell. A cathode lead 360 from anode collector 240 provides electrical contact with the cover. An anode lead 380 is connected to the battery can 320. An electrolytic solution is also added to the can.

With reference now to FIGS. 3 and 6, in one embodiment, the heating device 1 may comprise one or more components utilizing DC electric energy and can be equipped with a rectifier 58 that converts alternating current ("AC") electric energy from an external source conducted via a plug 28 of the power cord assembly 86 into DC electric energy. The rectifier 58 may be operatively coupled to the power supply 24 and the control assembly 22 to distribute DC electric energy as needed for proper operation of the heating device 1. When AC electric energy from an external source is unavailable or not being utilized, the rectifier 58 can conduct DC electric energy from the power supply 24 via a conductive pathway 64 to the control assembly 22. Since rectification of the DC electric energy from the power supply 24 is not needed if DC electric energy is demanded, the rectifier 58 can merely establish the conductive pathway 64 leading to the control assembly 22. In response to a control command input by the operator, the control assembly 22 can selectively establish and break conductive pathways corresponding to the control command to activate and deactivate the appropriate electric component(s) of the heating device 1.

With continued reference to FIGS. 3 and 6, alternate embodiments of the heating device 1 can optionally include a motor 15 or other electric component that is designed to be energized by AC electric energy. For such embodiments, if the power supply 24 comprises a DC source of electric energy, the heating device 1 can further include an inverter 66 to convert the DC electric energy from the power supply 24 into AC electric energy to be utilized by the motor 15 or other component requiring AC electric energy. When an external source of AC electric energy such as a wall outlet or generator is available, the rectifier 58 can conduct the AC electric energy via a conductive pathway to the control assembly 22 without rectifying it into DC electric energy. Thus, the AC electric energy conducted by the power cord assembly 86 from the external source is conducted to the control assembly 22 or directly to one or more components of the heating device 1 as AC electric energy for use in energizing one or more AC electric components corresponding to a control command input by the operator via switch 42, control panel 46, and the like. Additionally, if an external source of AC electric energy is available, the rectifier 58 can simultaneously rectify a portion of the AC electric energy into DC electric energy for supplying both AC and DC electric energy to the heating device 1. If the heating device 1 includes one or more electric components to be energized with AC electric energy and such electric energy is not available from an external source of AC electric energy, the inverter 66 may convert DC electric energy from the power supply 24 into AC electric energy. This inverted AC electric energy may be conducted by a conductive pathway 64 to the control assembly 22, which may establish one or more conductive pathways to the component(s) to be energized with AC electric energy corresponding to the control command input via switch 42, control panel 46, and the like.

With continued reference to FIGS. 3 and 6, in one embodiment, the portable power source 25 may comprise a rechargeable battery that can be selectively recharged utilizing power supplied by an external power source via the power cord assembly 86. The portable power source 25, such as a battery, may be selectively removable from the heating device 1 or may be fixedly connected to the heating device 1, as the recharging process may require the battery 25 to be removed from the heating device 1 in certain embodiments, while the battery 25 may be recharged while fixedly connected to the heating device 1 in other embodiments.

With continued reference to FIGS. 3 and 6, in one embodiment, the portable power source 25 may be in electrical communication with a recharging unit 29. The recharging unit 29 may be in electrical communication with one or more components of the heating device 1. The recharging unit 29 may in electrical communication with the portable power source 25 such that the recharging unit 29 can utilize energy supplied by the portable power source 25 and/or an external source of electrical energy to recharge the portable power source 25. The recharging unit 29 may be physically integrated with, selectively detachable from, or comprise a separate component of the heating device 1. The recharging unit 29 may allow the recharging of the portable power source 25 while the portable power source 25 is operatively coupled to the heating device 1 and/or when the portable power source 25 and/or recharging unit 29 is selectively removed from the heating device 1. In one embodiment, the portable power source 25 may comprise a battery and the recharging unit 29 may act as a generator, converting the thermal energy of a burning fuel into electrical energy thereby allowing the heating device 1 to become substantially self-recharging, and not require any external power source to recharge the battery 25 therein. In one embodiment, the recharging unit 29 may include a heat-conducting substrate composed of diamond or any other high thermal conductivity material, disposed in thermal contact with a high temperature region of the heating device 1. During operation of the heating device 1 while using the liquid fuel 20 of other fuel source, a portion of the heat generated may flow from the high temperature region into the heat-conducting substrate, from which the heat flows into an electrical power generator. A thermoelectric material such as a BiTe alloy-based film or other thermoelectric material may be placed in thermal contact with the heat conducting substrate. A low temperature region is located on the side of the thermoelectric material opposite that of the high temperature region. The thermal gradient generates electrical power that can be used to recharge the portable power source 25, comprising, for example, a lithium ion battery. In one embodiment, the recharging unit 29 may comprise a thermoelectric generator that uses catalytic combustion heat of fuel gas as a heat source for the generator, and has a construction wherein a thermoelectric element or a planar electric generation unit comprising thermoelectric elements has a construction held between the thermal input part and the heat radiation part, having fuel gas supply means and means for mixing fuel gas with air. The thermoelectric generator also has a structure such that the combustion heat can be directly supplied to the thermoelectric element by burning the mixed gas of fuel with air in a catalyst part arranged in the thermal input part, the thermal input part having a heat conductive end plate and a catalyst part which are in contact with the thermoelectric element, the face opposite to the thermoelectric element of the heat conductive end plate having a structure of convex and concave configuration with the catalyst part within the convex and concave configuration surface. The recharging unit 29 may function by any method well known in the art chosen with sound judgment by a person of ordinary skill in the art.

With reference now to FIGS. 1 and 6, in one embodiment, the power supply 24 may comprise a first portable power source 25*a* and a second portable power source 25*b*. The first portable power source 25*a* and/or second portable power source 25*b* may be integrated into the housing assembly 9 and/or within the interior chamber 21 of the heating device 1. The first portable power source 25*a* and/or second portable power source 25*b* may be detachable from the physical structure of the heating device 1 or may be positioned on a physically separate structure from the heating device 1. In one embodiment, the first portable power source 25*a* and/or second portable power source 25*b* may comprise a rechargeable battery, such as, for example, a lithium ion battery, that is integrated fully or partially with the housing assembly 9. The battery 25*a*, 25*b* may be selectively removable from the heating device 1 or may be fixedly connected to the heating device 1, as the recharging process may require the battery 25*a*, 25*b* to be removed from the heating device 1 in certain embodiments, while the battery 25*a*, 25*b* may be recharged while fixedly connected to the heating device 1 in other embodiments. The first portable power source 25*a* and/or second portable power source 25*b* may be in electrical communication with one or more components of the heating device 1 by a wire connection, a surface contact connection, a clip connector, or other methods of electrical connection well known within the art.

With continued reference to FIGS. 1 and 6, in one embodiment, the first and second portable power sources 25*a*, 25*b* may each comprise a battery and may be available within the heating device 1 for extended use of the battery as a power source. In one embodiment, the power supply 24 may comprise multiple lithium ion batteries that may be used as reciprocal recharging sources, wherein the first battery 25*a* can provide power to the external load of the heating device 1 while also providing power to recharge the second battery 25*b*. When the first battery 25*a* is depleted to a certain voltage level, an exchanger switch, not shown, may be activated and to cause the second battery 25*b* to begin providing power to the external load, while also directing a portion of power from the second battery 25*b* to recharge the first battery 25*a*. The exchanger switch, not shown, may allow the power to be provided to the external load of the heating device 1 without interruption, while also increasing the useful life of the batteries.

In one embodiment, the first portable power source 25*a* may comprise a thermoelectric generator and the second portable power source 25*b* may comprise a battery. The thermoelectric generator may be positioned within the housing assembly 9. In one embodiment, the thermoelectric generator may be at least partially positioned within the combustion region 10 to allow the thermoelectric generator to convert heat supplied by ignition of the air/fuel mixture into electric energy as is well known in the art. The thermoelectric generator may be in electrical communication with the control assembly 22 to communicate the generated electrical energy thereto.

In one embodiment, the first portable power source 25*a* may comprise a DC generator and the second portable power source 25*b* may comprise a battery. The DC generator may be positioned within the housing assembly 9 and may utilize the liquid fuel 20 to generate electrical energy as is well known in the art. The DC generator may be in electrical communication with the control assembly 22 to communicate the generated electrical energy thereto.

In one embodiment, the first portable power source 25*a* may comprise an AC generator and the second portable power source 25*b* may comprise a battery. The AC generator may be positioned within the housing assembly 9 and may utilize the liquid fuel 20 to generate electrical energy as is well known in the art. The AC generator may be in electrical communication with the control assembly 22 to communicate the generated electrical energy thereto.

With reference now to FIGS. 1-6, the control unit 27 may at least partially control the operation of the heating device 1. The control unit 27 may at least partially control the operation of the heating device 1 according to inputs provided by the operator and/or executable commands stored on computer-readable media associated with the control unit

27. In one embodiment, the control unit 27 may be located within the housing assembly 9 of the heating device 1. In a more specific embodiment, the control unit 27 may be located within the interior chamber 21 defined by the support 5 and may be electrical communication with the control panel 46, the motor 15 and/or the fuel assembly 17. Electric energy can be supplied by the power supply 24 to the control unit 27 via an electrical conductor 64 disposed within the interior chamber 21 of the support 5. The control unit 27 may be operatively coupled to the user interface devices provided to the heating device 1 such as the control panel 46, any other user input device, or any combination thereof to carry out control commands input by an operator. The control unit 27 may include necessary electrical and electronic hardware, software, or a combination thereof chosen with sound engineering judgment to respond to commands input by an operator via one or more user interface devices provided to the heating device 1. In one embodiment, the control unit 27 may comprise a controller 61, a power management module 63, a motor control module 65, and an ambient temperature compensation module 68. The controller 61 may comprise a microprocessor or similar device for at least partially controlling the operation of the heating device 1 according to predetermined executable instructions stored on a memory portion 62 in response to actions by the operator and/or operating conditions or parameters of the heating device 1.

The motor control module 65 may be designed to at least partially control the operation of the motor 15. In one embodiment, the motor control module 65 may be in electrical communication with the power supply 24 and the motor 15 and may control the operation of the motor 15 by controlling the supply of electrical energy to the motor 15 thereby causing fan blades 18 to rotate at a speed that is directly related to the amount of electrical power supplied to the motor 15. For example, to increase the speed of rotation of fan blades 18 the motor control module 65 may cause the amount of electrical power supplied to the motor 15 to be increased. Conversely, to decrease the speed of rotation of fan blades 18 the motor control module 65 may cause the amount of electrical power supplied to the motor 15 to be decreased. In one embodiment, the motor control module 65 may control the operation of the motor 15 to vary the speed of rotation of fan blades 18, and therefore the output of the heating device 1, based at least partially on a determined value of fuel intake and/or heat output of the heating device 1.

In another embodiment, the motor control module 65 may control the operation of the motor 15 to vary the speed of rotation of the fan blades 18, and therefore the output of the heating device 1, based at least partially on a current component temperature of one or more components of the heating device 1. The control assembly 22 may determine the temperature of one or more components of the heating device 1. In one embodiment, the control assembly 22 may determine the temperature of a component of the burner assembly 23 and/or the housing assembly 9. The control unit 27 may cause the current component temperature to be stored in the memory portion 62. The motor control module 65 may compare the current component temperature with a predetermined component temperature and may cause the operation of the motor 15 to be altered based on the comparison. The predetermined component temperature may be stored in the memory portion 62 and may be inputted by the operator or during the manufacture of the heating device 1. In one embodiment, if the motor control module 65 determines that the current component temperature is greater than the predetermined component temperature, the motor control module 65 may cause the operation of the heating device 1 to be terminated. The motor control module 65 may cause the operation of the heating device 1 to be terminated by preventing electrical energy from being supplied to the motor 15 and/or by transmitting an electrical signal to the control unit 27. Upon receipt of the electrical signal, the control unit 27 may cause the operation of the heating device 1 to be terminated. Additionally, upon terminating the operation of the heating device 1 based on the current component temperature, the control assembly 22 may prevent the operation of the heating device 1 until the current component temperature is less than the predetermined component temperature and/or for a predetermined period of time. In one embodiment, the control assembly 22 may determine the current component temperature periodically. Each current component temperature determined by the control assembly 22 may be stored in the memory portion 62. The motor control module 65 may cause the operation of the motor 15 to be altered based on the current comparison of the current component temperature and the predetermined component temperature as well as the previous comparisons. In one embodiment, the motor control module 65 may cause the operation of the motor 15 to be altered based at least partially on determining the rate of change between the current component temperature and the predetermined component temperature over a certain or predetermined period.

The power management module 63 may at least partially control the operation of the power supply 24 to control the supply of power to one or more components of the heating device 1. The ambient temperature compensation module 68 may control the operation of the motor 15 to vary the speed of rotation of the fan blades 18, and therefore the output of the heating device 1, based at least partially on an ambient temperature relative to a predetermined temperature. In one embodiment, the control assembly 22 may allow the operator to input a desired or predetermined temperature of the ambient environment surrounding the heating device 1. The control unit 27 may cause the predetermined temperature to be stored in the memory portion 62. The control assembly 22 may determine the current temperature of the ambient environment which the control unit 27 causes to also be stored in the memory portion 62. The ambient temperature compensation module 68 may compare the current temperature with the predetermined temperature and may cause the operation of the motor 15 to be altered based on the comparison. For example, the ambient temperature compensation module 68 may determine that the current temperature is less than the predetermined temperature and cause the electrical power supplied to the motor 15 to be increased. In one embodiment, the control assembly 22 may determine the current temperature periodically. Each current temperature determined by the control assembly 22 may be stored in the memory portion 62. The ambient temperature compensation module 68 may cause the operation of the motor 15 to be altered based on the current comparison of the current temperature and the predetermined temperature as well as the previous comparisons. In one embodiment, the ambient temperature compensation module 68 may cause the operation of the motor 15 to be altered based at least partially on determining the rate of change between the current temperature and the predetermined temperature over a certain or predetermined period.

Figure 5:
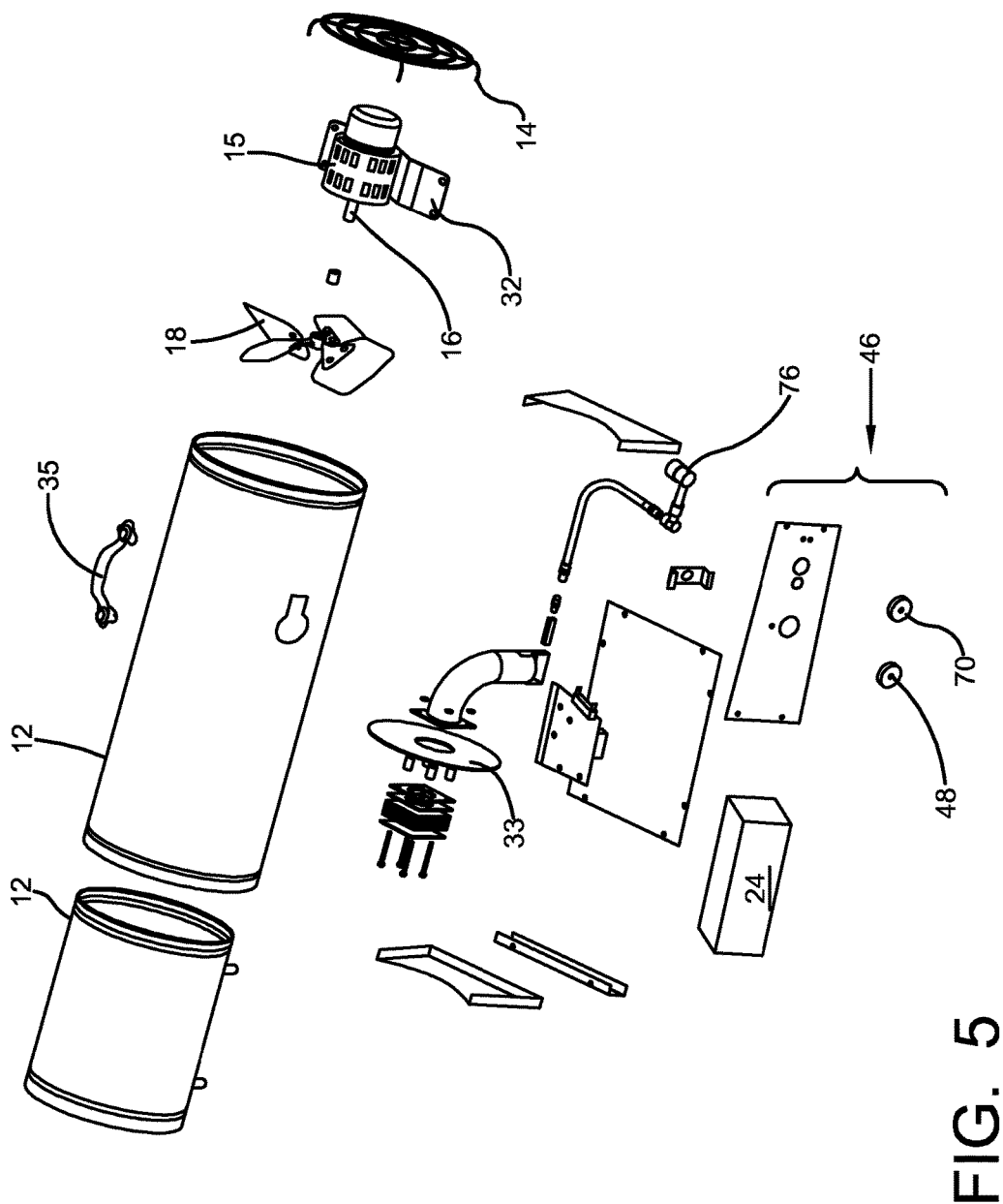
FIG. 5 is an assembly view of a forced-air heater including an onboard power supply in accordance with an embodiment of the present invention.
Figure 12:
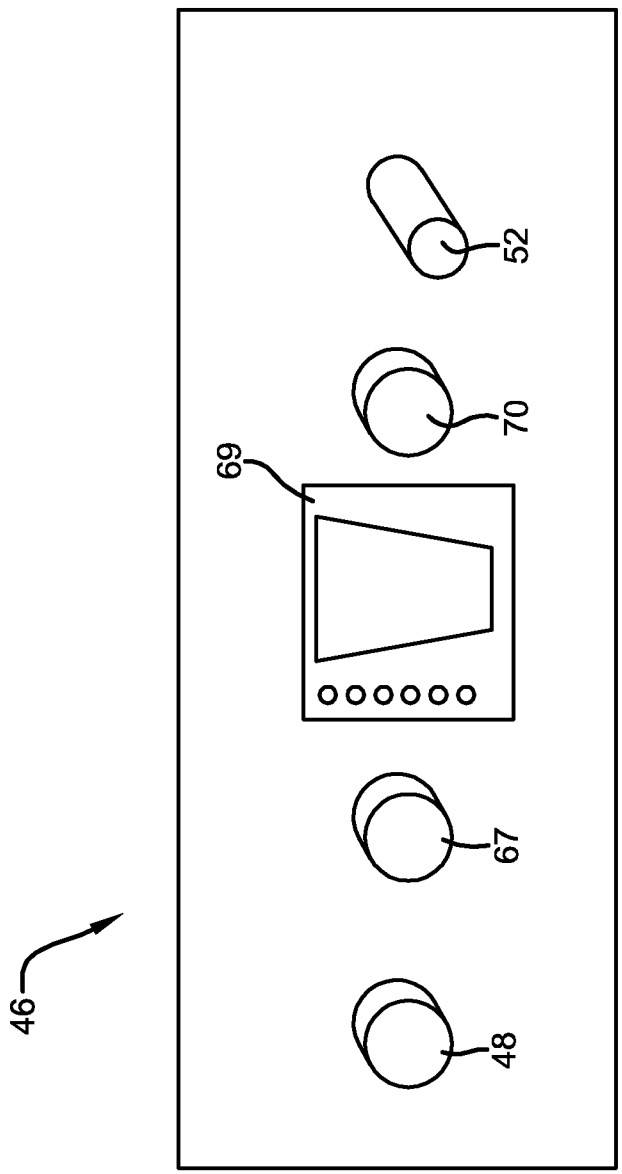
FIG. 12 is an illustrative view of a control panel for a heating device according to one embodiment of the invention.
Figure 13:
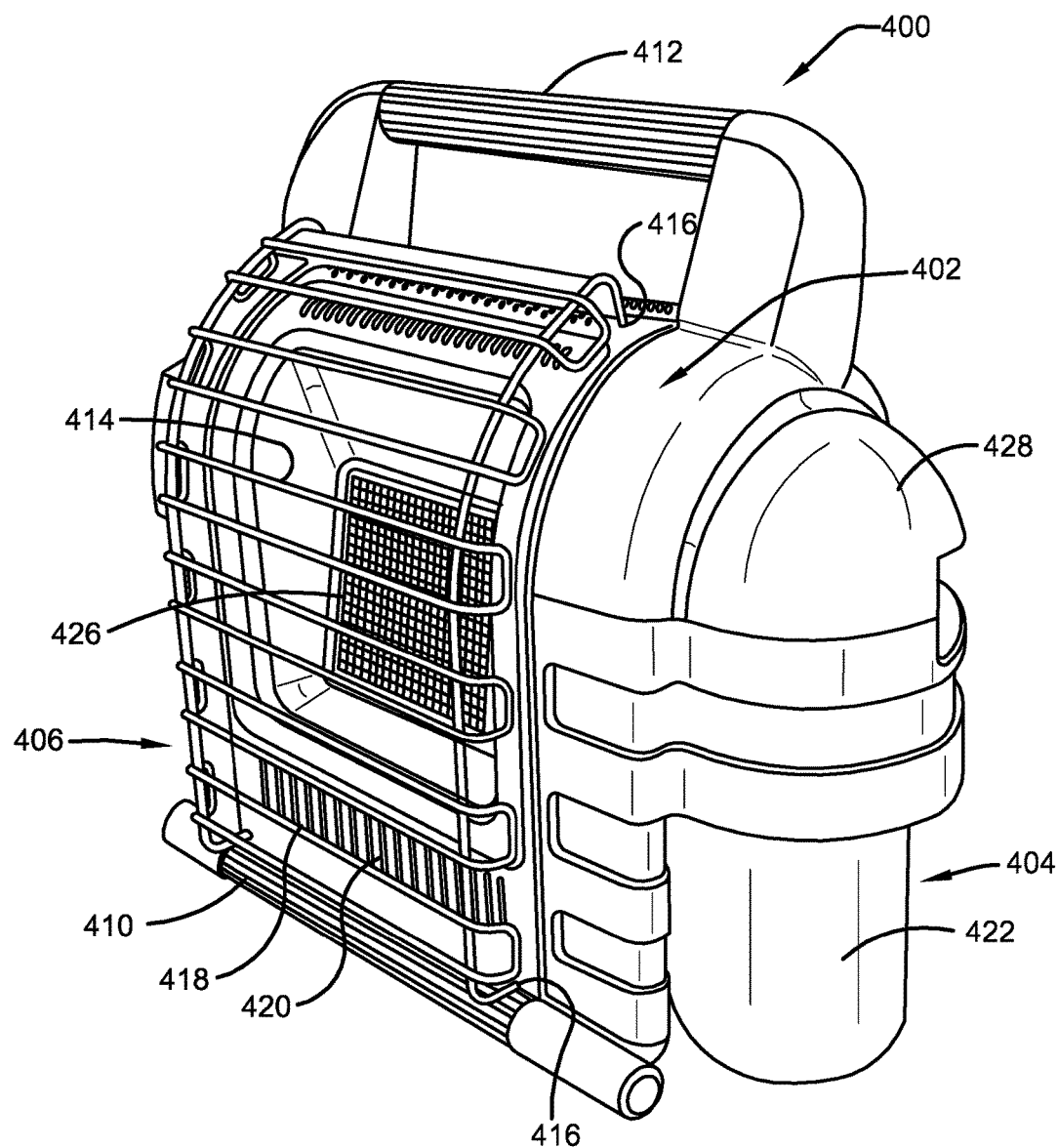
FIG. 13 is a perspective view of a radiant heater including an onboard power supply in accordance with an embodiment of the present invention.
Figure 14:
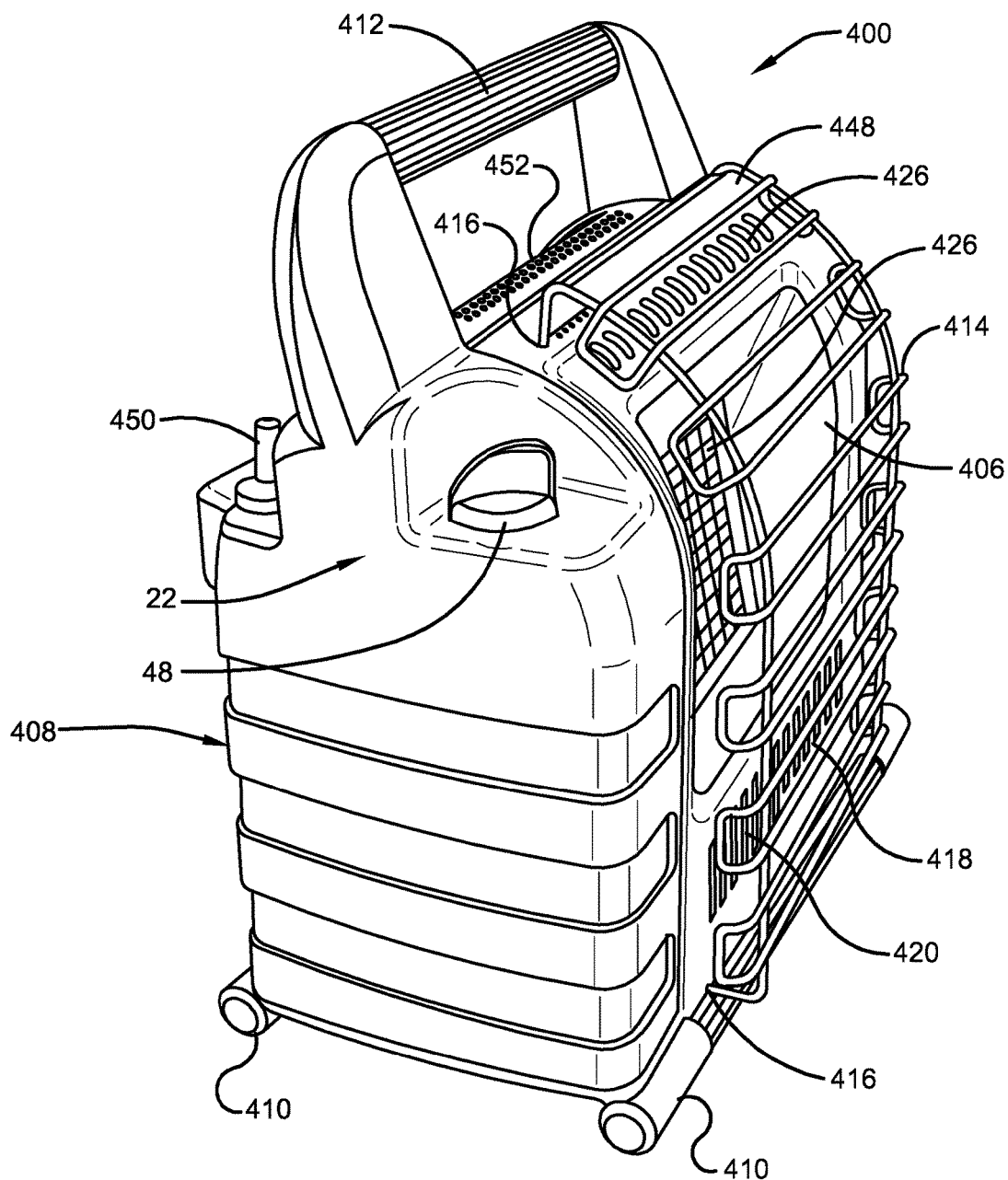
FIG. 14 is a perspective view of a radiant heater including an onboard power supply in accordance with an embodiment of the present invention.
Figure 15:
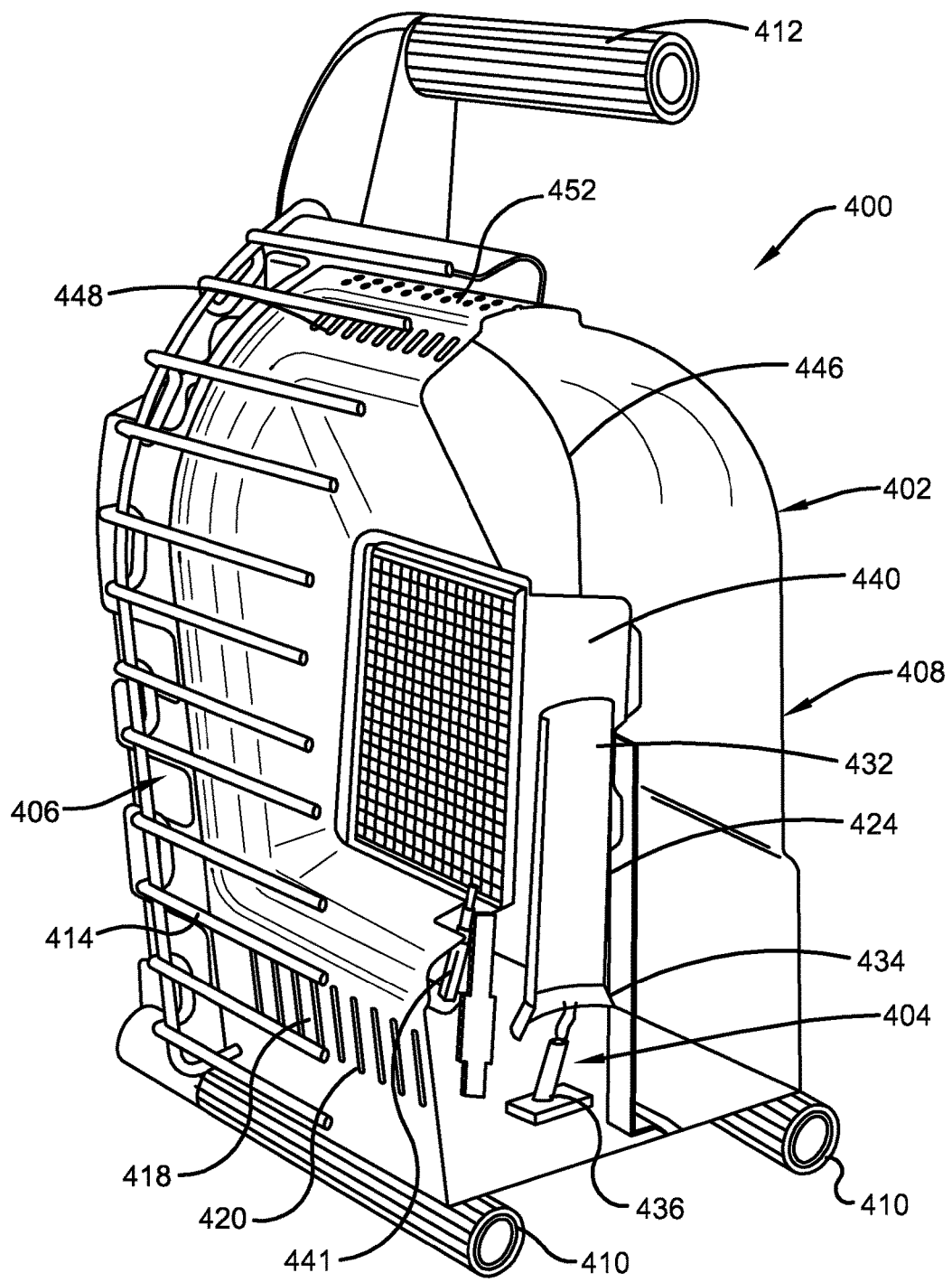
FIG. 15 is a cutaway view of a radiant heater including an onboard power supply in accordance with an embodiment of the present invention.
Figure 16:
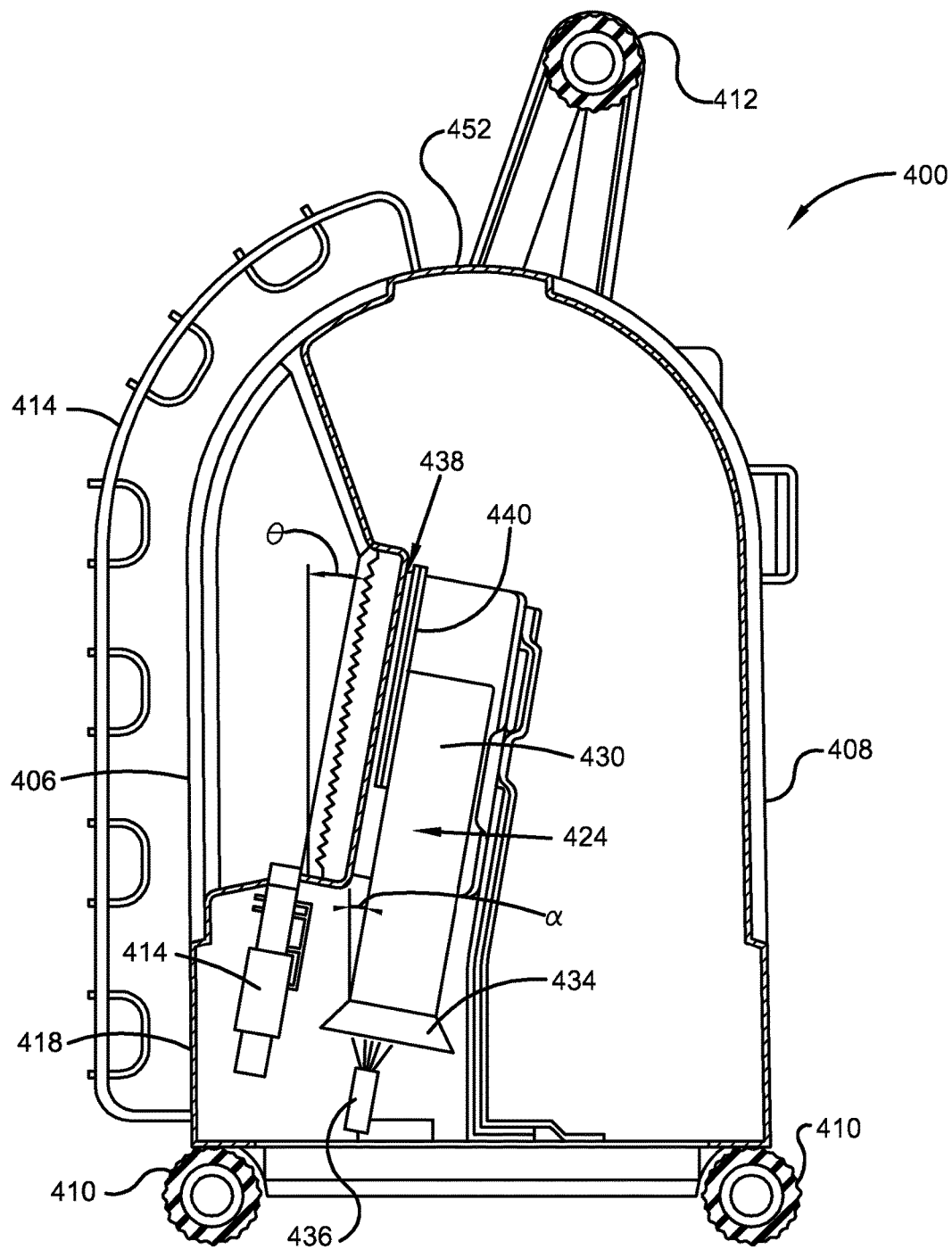
FIG. 16 is a cutaway side view of a radiant heater including an onboard power supply in accordance with an embodiment of the present invention.
Figure 19:
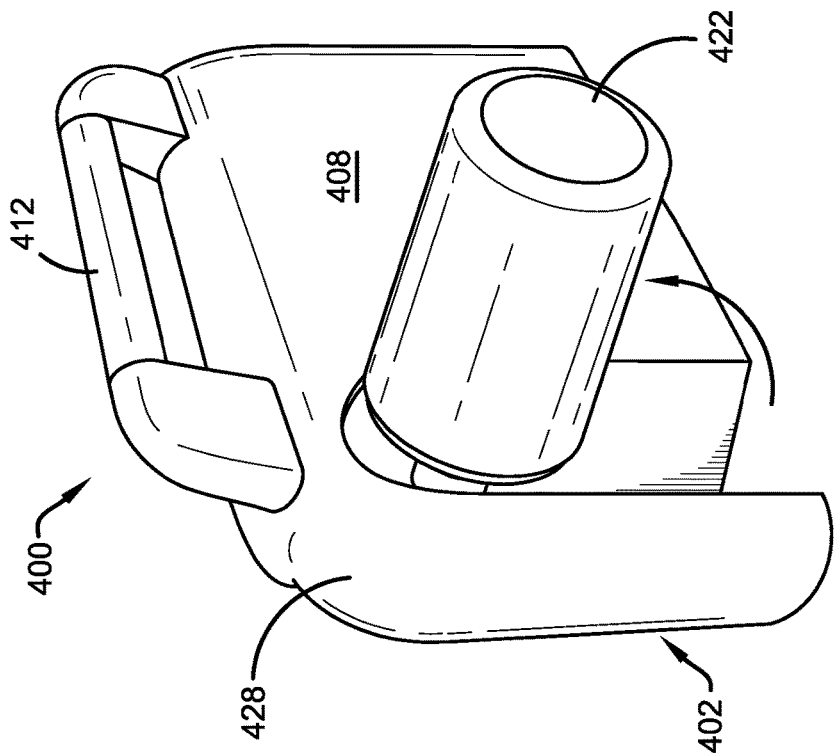
Figure 18:
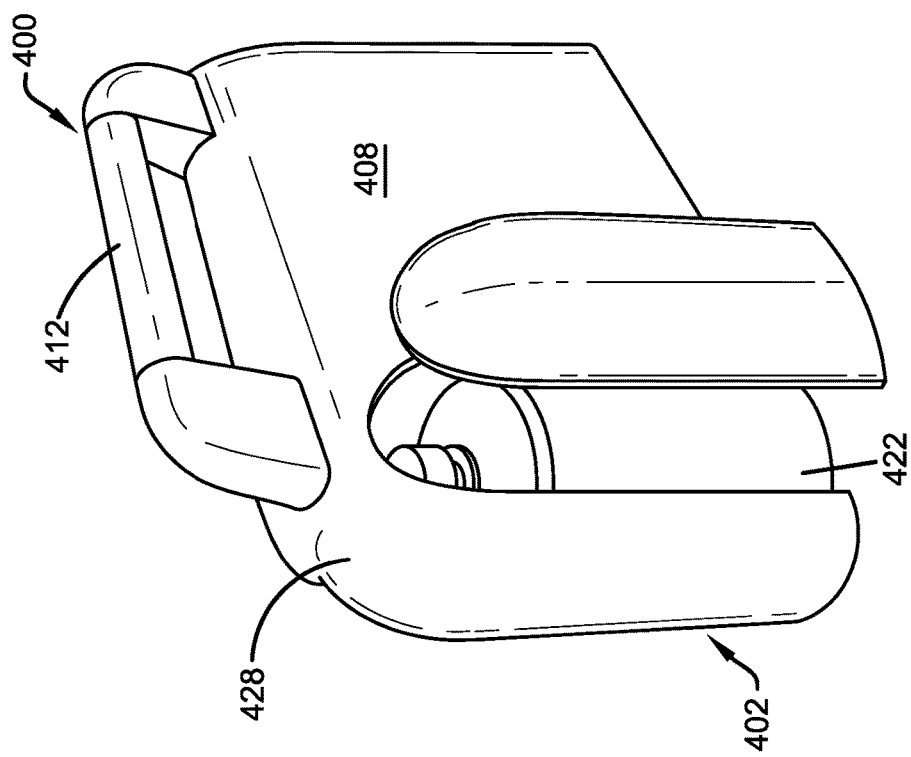
FIG. 18 is a rear elevational view of a radiant heater including an onboard power supply showing a detachable door for enclosing a fuel tank in accordance with an embodiment of the present invention; and, FIG. 19 is a rear elevational view of the radiant heater shown in FIG. 18 wherein the detachable door is removed thereby illustrating the fuel tank which is pivotable about a fuel supply connection in accordance with an embodiment of the present invention.

With reference now to FIGS. 5 and 12, in one embodiment, the control panel 46 may comprise an output adjustment interface 70. The output adjustment interface 70 may be in electrical communication with the control assembly 22 and may allow for the selective control of the output of the heating device 1. In one embodiment, the output adjustment interface 70 may comprise an interface assembly, such as, for example, a knob, or other type of adjustment device that allows the operator to selectively control the speed of the motor 15 to control the output of the heating device 1. The adjustment or actuation of the output adjustment interface 70 may cause the control unit 27 to adjust the speed of the motor 15 by adjusting or controlling the amount of electrical power supplied to the motor 15 by the power supply 24. In another embodiment, the output adjustment interface 70 may comprise an interface assembly or other type of adjustment device that allows the operator to selectively control the burn rate of the heating device 1. The adjustment or actuation of the output adjustment interface 70 may cause the control unit 27 to adjust the burn rate of the heating device 1 by adjusting or varying the supply of liquid fuel 20 and/or ambient air into the burner assembly 23 and/or the combustion region 10.

In one embodiment, the power supply 24 may be in electrical communication with the power management module 63 such that the power management module 63 can control the configuration of one or more portable power sources of the power supply 24. For example, the power management module 63 may allow for the configuration of one or more portable power sources of the power supply 24 to be placed in parallel and/or in series when providing power to one or more components of the heating device 1. The power management module 63 may be in electrical communication with a power selector actuator 67 of the control panel 46 may allow the operator to selectively control the configuration of one or more power sources of the power supply 24 for operation of one or more components of the heating device 1.

With reference now to FIGS. 1-6 and 12, the control panel 46 may be operatively coupled to the heating device 1 to allow the operator to control heating of the ambient environment by the heating device 1. The control panel 46 may be in electrical communication with the control unit 27 to transmit electrical signals that can be received by the control unit 27 in response to inputs or commands of the operator (i.e., actuation of one or more components of the control panel 46 by the operator for controlling or adjusting the operation of the heating device 1), upon determining one or more operating conditions of the heating device 1, and/or determining one or more environmental conditions. The control panel 46, in the illustrative embodiments shown in FIGS. 1 and 2, may include a thermostat interface 48 and an ignition switch 52. In one embodiment, the thermostat interface 48 can be rotated about a central axis to a desired temperature to which the operator wishes to heat the ambient environment of the heating device 1. The thermostat interface 48 can be infinitely adjusted between high and low temperature limits, or can be rotated to one or more predetermined temperature settings such as LOW, MEDIUM and HIGH. The temperature selected with the thermostat interface 48 can govern operation of the motor 15, ignition of an air/fuel mixture, the supply of liquid fuel 20 to the combustion region 10, the ratio of air to fuel provided to the combustion region 10, the ignition 53, or any combination thereof. As is known in the art, a thermostat, not shown, may be operatively coupled to the thermostat interface 48 to control activation, deactivation, and operation of any of these components to maintain the temperature within the ambient environment of the heating device 1 at approximately the temperature selected with the thermostat interface 48. The thermostat interface 48 may be electrical communication with the control unit 27 and may transmit signals to the control unit 27 thereby allowing the control unit 27 to control the operation of the heating device 1 based at least partially on the data received from the thermostat, not shown. In one embodiment, the thermostat interface 48 may be integrated with the control panel 46. In another embodiment, the thermostat interface 48 may comprise a separate component that is selectively detachable from the control panel 46. The selective detachment of the thermostat interface 48 may allow the operator to remotely control the operation of the heating device 1. In one embodiment, the thermostat interface 48 may be hard-wired to the control panel 46 wherein an electrical conductor suitable for allowing for the transmission of electrical signals is operatively connected to and extends between the thermostat interface 48 and the control panel 46. In another embodiment, the thermostat interface 48 may comprise a wireless device wherein electrical signals, such as, for example, radio frequency (RF) signals, can be transmitted wirelessly between the thermostat interface 48 and the control panel 46.

The power management module 63 may comprise a device for at least partially controlling the supply of power to the heating device 1. The power management module 63 may be in electrical communication with the power supply 24 and the control unit 27 to selectively supply power to components of the heating device 1 from one or more sources of electrical power. The power management module 63 may be in electrical communication with the control panel 46. The control panel 46 may comprise a power selector actuator 67 that allows the operator to selectively control the source of power to the heating device 1. In one embodiment, the power management module 63 may at least partially control the recharging of the portable power source 25 via power supplied by, for example, an external power source, and may allow for the recharging of the portable power source 25 both during operation of the heating device 1 and while the heating device 1 is not operating.

With reference now to FIGS. 6 and 12, in one embodiment, the control panel 46 may comprise a power indicator 69 for providing information to the operator relating to the power supplied by the power supply 24. In one embodiment, the power indicator 69 may comprise a device for displaying the level of charge of the portable power source 25. For example, in embodiments wherein the portable power source 25 comprises a battery, the power indicator 69 may indicate when the battery is fully charged and/or has a low or depleted charge. In another embodiment, the power indicator 69 may comprise a device for displaying information relating to the source of power being supplied to the heating device 1. For example, the power indicator 69 may indicate that power is being supplied via the portable power source 25 or by an external source of supply via the power cord assembly 86.

With reference now to FIGS. 1-6, in one embodiment, the control assembly 22 may comprise an oxygen depletion sensor (ODS) system 31 to sense levels of carbon monoxide or other indoor air pollution in the local vicinity of the heating device 1. The ODS system 31 may be in electrical communication with the power management module 63. The power management module 63 may cause the heating device 1 to be switched to electric power upon the determining that pollution or monoxide levels become unsafe, or as otherwise programmed. In one embodiment, the power supply 24 may comprise first and second portable power sources 25*a*, 25*b*. The second portable power source 25*b* may comprise a battery, and upon the determining that pollution or monoxide levels become unsafe, or as otherwise programmed, the power management module 63 may cause the first portable power source 25a to stop supplying power to the heating device 1 and may cause the second portable power source 25b to start supplying power to the heating device 1. The second portable power source 25b (i.e., the battery) may be used as the sole source of power to the heating device 1 for a limited or extended period of time, or the second portable power source 25b may be utilized simultaneously, consecutively, or sporadically with the first portable power source 25a (i.e., an electric generator).

With reference now to FIGS. 1-3 and 6, in one embodiment, the heating device 1 may further include an optional electric energy outlet 81 into which external electric accessories such as radios, clocks, power tools and the like can be plugged. The outlet 81 may include one or more receptacles 83 (e.g., female receptacle) that can receive conventional two-prong electric power cord plugs. Accordingly, each receptacle 83 may include at least two apertures 85 into which the prongs of the plug provided to the external electric accessory are inserted to establish an electrical connection between the heating device 1 and the external electric accessory. The outlet 81 can act as a source of AC electric energy to energize the external electric accessory when a conventional wall outlet or generator is not available. The outlet 81 can also act as an extension of a conventional wall outlet or generator when such an external source of AC electric energy is available. When an external source of AC electric energy is unavailable, the inverter 66 can convert DC electric energy from the power supply 24 into AC electric energy that can be supplied via the outlet 81. The AC electric energy output by the inverter 66 can be in the form of a sinusoid having a peak in the form of a with a peak voltage of about 170 volts and a frequency of about 60 Hz, similar to the AC electric energy sourced by a conventional wall outlet. However, it should be noted that the AC electric energy output by the inverter 66 can deviate from a perfect sinusoid, and in fact, can take on the shape of a square wave, triangular waveform, and any other waveform shape suitable for energizing an external electric accessory.

When an external source of AC electric energy is available to the heating device 1, the rectifier 58 can conduct the AC electric from the external source to the control unit 27. The control unit 27 may be operatively connected to the one or more electrical outlets 81 to establish a conductive path there between. Thus, in addition to controlling the flow of any AC electric energy required to energize one or more components of the heating device 1, the control unit 27 can also direct the AC electric energy to the outlet 81. Even when the heating device 1 is not combusting the air/fuel mixture to deliver thermal energy to the ambient environment of the heating device 1, the outlet 81 can still be utilized to provide power to an external electric accessory. This is true regardless of whether the AC electric energy is converted from DC electric energy from the power supply 24 or supplied from a conventional wall outlet, generator or the like through the plug 28 of the heating device 1. Thus, the power supply 24 provided to the heating device 1 can selectively supply electric energy, AC, DC, or any combination thereof to one or more of the following electric components of the heating device 1: an igniter such as a hot surface igniter, spark igniter, and the like; a fan; a blower; one or more electrical outlets 81 (e.g., VAC); one or more lights 38; a thermostat; and any combination thereof. Further, the power supply 24 can supply this electric energy during operation of the heating device 1 (i.e., simultaneously while combustion of the liquid fuel 20 is taking place) or while the heating device 1 is not currently operating (i.e., in the absence of the combustion of the liquid fuel 20). And the electric energy supplied by the power supply 24 can be supplied at least temporarily in the absence of an external source of electric energy, simultaneously with the supply of electric energy from an external source, or as a backup power supply.

The embodiments utilizing the power supply 24 as the sole source of power allow for ease in portability of the heating device 1, as the heating device 1 is not confined to a certain location due to availability of a gas supply or AC power source. The embodiments that do not utilize a gas supply for any portion of the power necessary to operate the portable heater eliminate concerns of indoor air pollution and carbon monoxide production by the heater, and further extend the use of the heater by not limiting operation to the availability of a gas supply. The embodiments that do not utilize AC power for any portion of the power required for operation of the heating device 1 allow for increased portability of the heating device 1 as the position of the heating device 1 is not limited by the length of the AC power cord or AC power supply, and also allows for use of the heating device 1 during periods of time when AC power is not availability due to outages or other unavailability of AC power.

The heating device 1 may also utilize the power supply 24 for power in any combination of the above mentioned ways. When more than one energy source is available, the control assembly 22 may allow the operator to selectively provide power to the heating device 1 from each of the available energy sources. This choice may be provided to the operator by allowing them to push a button, flip switch, or otherwise affirmatively choose the energy source for use.

With reference now to FIGS. 6 and 13-15, according to one embodiment, the heating device 1 may comprise an infrared heater 400. The infrared heater 400 may comprise a gas-fired, unvented heating device suitable for use in confined spaces such as, for example, recreational enclosures. The infrared heater 400 may comprise a housing assembly 402, a fuel assembly 404, and the control assembly 22. The housing assembly 402 may comprise a front face 406 and a rear face 408. The housing assembly 402 may comprise the base for supporting the infrared heater 400. In one embodiment, the housing assembly 402 may comprise a pair of elongated legs 410 laterally disposed along the outboard edges of the rear face 408 and the front face 406 respectively. A handle 412 may be recessed from and extend from the top of the infrared heater 400 at an angle directed away (approximately 15°) from the front face 406. The front face 406 may comprise a stepped recess formed in an upper front corner region for supporting at least a portion of the control assembly 22. In one embodiment, the stepped recess may support the thermostat interface 48 described above. A shield or metal grid 414 may be attached to the front face 406 of the infrared heater 400 to provide protection to the heater components and prevent accidental contact with the hot portions of the front face 406. The shield 414 may comprise elongated wire metal strips and peripheral pieces that are received in openings 416 in the housing to secure the shield 414 to the infrared heater 400. An opening or air inlet 418 may be disposed on a lower portion of the front face 406 of the infrared heater 400 for receiving and filtering air drawn into the housing assembly 402. The air inlet 418 may be formed from a series of elongated slits 420 spaced equidistance across the housing assembly 402 beneath the shield 414.

With reference now to FIGS. 12-19, the fuel assembly 404 may comprise a fuel tanks 422, a burner assembly 424, and a radiant surface 426. The fuel tanks 422 may be secured to and partially enclosed by the housing assembly 402. The fuel tanks 422 may comprise a removable canister or tank that can be replaced by a new tank or removed, refilled, and re-installed in the housing assembly 402. In one embodiment, a conical dome 428 may protrude from the side of the housing assembly 402 and partially encloses the fuel tanks 422. The burner assembly 424 may comprise a burner venturi 430 enclosed within the housing assembly 402. The burner venturi 430 may operate to mix oxygen and liquid fuel 20 for combustion. The burner venturi 430 may comprise a hollow generally cylindrical body 432 and a tapered mouth 434 having a wider diameter than the body 432. The burner venturi 430 may be disposed at an angle relative to the longitudinal axis of the infrared heater 400. The mouth 434 of the burner venturi 430 may be positioned on approximately the same axial plane as the air inlet 418. The cylindrical body 432 may extend upwardly from the mouth 434. An orifice 436 may be in fluid communication with the fuel tanks 422 and may be located directly beneath the mouth 434 of the burner venturi 430. In one embodiment, the fuel tanks 422 may be connected to a regulator which connects to a valve and orifice 436 that may be selectively adjustable between open and closed positions.

With continued reference to FIGS. 12-19, the radiant surface 426 may comprise a generally planar surface and may be positioned within the housing assembly 402 and disposed at an angle α relative to the longitudinal axis of the infrared heater 400. A rear face of the radiant surface 426 may be in communication with a cavity or plenum chamber 438. The plenum chamber 438 may receive the air/fuel mixture from the burner venturi 430 and may cause the air/fuel mixture to be distributed over and through the rear face of the radiant surface 426. Thus, in operation, the orifice 436, attached to the fuel tanks 422, may be opened releasing the liquid fuel 20, such as, for example, propane, into the mouth 434 of the burner venturi 430. The regulator may be associated with the orifice 436 to reduce the delivery pressure of the liquid fuel 20 from the fuel tanks 422. The stream of liquid fuel 20 exiting the orifice 436 may create a vacuum effect drawing air from the air inlet 418 into the mouth 434 of the burner venturi 430. The liquid fuel 20 and air may be thoroughly mixed in the burner venturi 430 and plenum chamber 438 in order to achieve substantially complete combustion and produce a clean burning infrared heating surface. The air/fuel mixture may travel upward through the cylindrical body 432 of the burner venturi 430 until reaching the plenum chamber 438. To prevent the air/fuel mixture from immediately exiting the plenum chamber 438, a baffle 440 may be provided to force the air/fuel mixture downward into communication with the rear face of the radiant surface 426.

With continued reference to FIGS. 12-19, the radiant surface 426 may comprise a burner tile or a multi-ply screens (not shown) that define a plurality of small openings which permit combustion of the air/fuel mixture as it passes there through. A container 441 may house a pilot 442 and an igniter 444 for initially sparking or igniting the air/fuel mixture. In one embodiment, an igniter button 450 for activating the infrared heater 400 may be supported in a second recess disposed on the upper back corner of the side of the housing assembly 402. In addition to housing the pilot 442 and the igniter 444, the container 441 may house an oxygen depletion system. The oxygen depletion system (ODS) may provide an automatic shutoff mechanism when decreased oxygen levels and resulting increased carbon monoxide concentrations are detected. In one embodiment, a thermocouple may monitor changes in temperature of the pilot flame which indicates changes in oxygen and carbon monoxide levels. A reflector 446 may extend outwardly from the top of the burner plenum 438 at an angle directed toward the top portion of the front face 406 of the housing assembly 402. The natural convective upward path of the combustion products leads the combustion products into contact with the reflector 446. The reflector 446, in addition to directing the radiant energy output from the infrared heater 400 toward the front face 406 of the housing assembly 402, may also act as a deflector and may reduce the temperature of the combustion products exiting the infrared heater 400. A first outlet 448 may be disposed near the top of the housing assembly 402 allowing warm air to mix with combustion products and exit the infrared heater 400 after contacting the reflector 446. A second outlet 452 may be disposed rearward of the first outlet 448 and may communicate with the interior of the housing assembly 402. The second outlet 452 may provide a continuous flow path for air (that does not enter the burner venturi 430) to flow from the air inlet 418 around the rear of the plenum chamber 438 and exit the housing assembly 402 rearward of the reflector 446. A portion of the ambient air drawn into the housing assembly 402 may be used for combustion purposes and the remainder may convect upwardly along the rear of the plenum chamber 438 to exit via the second outlet 452. As the burner venturi 430 is heated, the thermal convection properties urge the air/fuel mixture through the upwardly angled burner venturi 430 creating a chimney type effect. The chimney effect created increases the fresh air flow velocity into the burner venturi 430, enabling the pressure from the fuel tanks 422 to be reduced, yet burn efficiently on high or low settings.

With reference to FIGS. 6 and 17-19, according to one embodiment, the housing assembly 402 may comprise a motorized fan 454, such as, for example, a paddle or cage fan, positioned within the housing assembly 402. The motorized fan 454 may at least partially cause an improved air flow through the infrared heater 400. The motorized fan 454 may be in electrical communication with the control assembly 22 such that the motorized fan 454 can be supplied power by the power supply 24 as described above. The motorized fan 454 may comprise a plurality of paddles or inwardly extending panels for creating air movement through rotational pivotal movement about axis 456. In one embodiment, the motorized fan 454 may comprise a lower voltage fan, e.g., 3.0 volts, and may be powered by a direct current motor. The motorized fan 454 may provide an increased air flow that at least partially ensures maximal cooling capacity on various metal and plastic components of the infrared heater 400.

A light 38 can optionally be coupled to the heating device 1 to illuminate an environment within the vicinity of the heating device 1. The light 38 can be any conventional electric light including, but not limited to a fluorescent light, incandescent light, high-intensity light emitting diode ("LED") array, and the like. A clear or slightly opaque protective shroud or lens can optionally be provided to protect the light 38 from being damaged by other objects near the heating device 1. Further, operation of the light 38 can be controlled by the operator with a switch 42 independent of the operation of the other components of the heating device 1 and the combustion of fuel from the fuel tank 3. The switch 42 can be any type of operator input device, such as a multi-position switch, one or more push button switches (as shown in FIGS. 1 and 2), and the like. In FIGS. 1 and 2, the switch 42 includes an ON pushbutton switch 42a and an OFF pushbutton switch 42b, which turn the light 38 on and off, respectively. According to alternate embodiments, the switch 42 can optionally offer a plurality of intensity settings, such as low, medium and high, or can be controlled with an infinitely adjustable dimmer switch to control the intensity of the light 38.

An alternate embodiment of a forced-air heater 110 according to one embodiment is shown in FIG. 8. The embodiment in FIG. 8, in combination with one or more of the features discussed above, can optionally further include a chassis that facilitates mobility of the heater 110, and the ability to be stored in a substantially-vertical orientation while mitigating leakage of fuel (e.g., liquid fuel) from the fuel tank 114. One or more wheels 124 can optionally be provided to facilitate transportation of the forced-air heater 110. Each wheel 124 can include a rim 126 provided with a rubberized exterior coating 128 about its exterior periphery. According to an embodiment of the forced-air heater 110, the fuel tank 114 includes a generally-cylindrical passage formed in the housing through which an axle extends to support the wheels 124. Each wheel 124 can also optionally be positioned within a wheel well 130 formed in the fuel tank 114. The wheel wells 130 allow the wheels 124 to be recessed inwardly toward the center of a fuel tank 114 thereby giving the forced-air 110 a generally-streamlined configuration.

A frame 132 fabricated from an arrangement of tubes or rods made from a metal or other suitably-strong material for supporting the weight of a fully fueled forced-air heater 110 forms a cage that at least partially encases the heating conduit 112 and fuel tank 114. The frame 132 includes a proximate end 134 and a distal end 136 separated by longitudinally extending members 138. A cross member 140 can serve as a handle at the proximate end 134, allowing the operator to grasp the forced-air heater 110 and maneuver it as desired. A member 138' can extend longitudinally along each side of the forced-air heater 110 adjacent to the fuel tank 114 and externally of the wheels 124. In this arrangement, the member 138' allows for simplified installation of the wheels 124 and the frame 132, and also protects the wheels 124 from impacting nearby objects while the forced-air heater 110 is being maneuvered.

FIG. 9 illustrates transportation of the forced-air heater 110 in a somewhat vertical orientation according to an embodiment of the present invention. The orientation of the forced-air heater 110 shown in FIG. 9 is but one of the possible orientations in which the forced-air heater 110 can be oriented while mitigating leakage of liquid fuel from the fuel tank 114. The example orientation is illustrative of an alternate orientation, other than the orientation in which the forced-air heater 110 is typically operated, such as illustrated in FIG. 8.

FIG. 10 illustrates an embodiment of a forced-air heater 110 in a substantially-vertical storage orientation. When not in use, the forced-air heater 110 can be disposed in a vertical orientation, on the distal end 136 of the frame 132. The tubing, comprising a metal or other strong material, forms the distal end 136 of the frame 132 and is patterned to give the distal end 136 a suitable footprint that can maintain the forced-air heater 110 in the substantially vertical orientation shown in FIG. 8. The footprint of the distal end 136 can optionally be so dimensioned to maintain the substantially-vertical orientation of the forced-air heater 110 even when minor lateral forces are imparted on the forced-air heater 110.

While the forced-air heater 110 is in the substantially-vertical storage orientation, a rain shield 142 is disposed at a proximal end of the frame 132, for example, thereby mitigating entry of falling objects or other debris into the heating conduit 112. The rain shield 142 can comprise a planar sheet of metal or other rigid material that extends between the cross member 140 that serves as the handle and a second cross member 144. With the rain shield 142 disposed as shown in FIG. 10, it interferes with the entry of falling objects into the end of the heating conduit 112 in which air is drawn from the ambient environment.

The forced-air heater 110 has been described thus far and illustrated in the drawings as optionally including a rain shield 142 adjacent to the ambient air intake end of the heating conduit 112. However, it is to be noted that the present invention is not limited solely to such an arrangement. Instead, the present invention also encompasses a forced-air heater 110 that can be stored in a substantially-vertical orientation such that the discharge end of the heating conduit 112 from which heated air is forced is aimed upwardly, and the ambient air intake end is aimed toward the ground. Of course, the fuel-management system of the present invention described below may be adapted accordingly.

Figure 11:
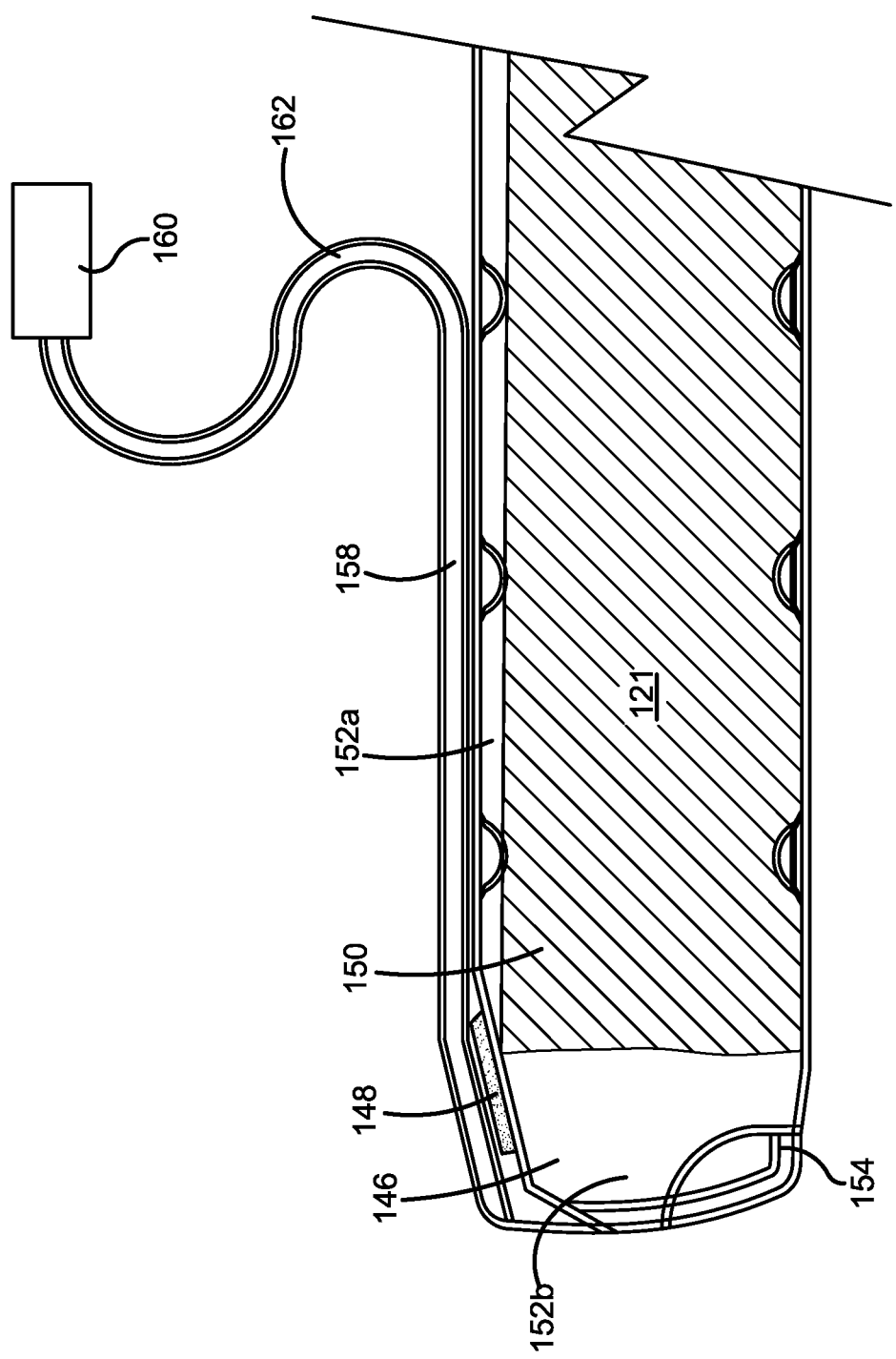
FIG. 11 is a cutaway view of a fuel management system that can optionally be provided to a forced-air heater according to an embodiment of the present invention.

FIG. 11 is a cross-section view of an embodiment of a fuel tank 114, which forms a portion of the combustion heater's fuel-management system. The fuel tank 114 includes one or more cavities 146 that alternately accommodates liquid fuel and an air gap 152 that is shifted when the forced-air heater 110 is transitioned from its firing orientation (shown in FIG. 8) to its substantially-vertical storage orientation (shown in FIG. 10), and vice versa. A fuel outlet 154 is provided adjacent to the lowermost portion of the fuel tank 114 while the forced-air heater 110 is in its horizontal firing position. Positioning the fuel outlet 154 in this manner allows approximately all of the fuel to be removed from the fuel tank 114 during operation of the forced-air heater 110.

A hose 158 is connected between the fuel outlet 154 and a nozzle 160 through which the fuel is metered into the combustion chamber 120. The hose 158 can be fabricated from any material that will resist damage and degradation from exposure to the particular fuel used to fire the forced-air heater 110. Examples of the types of fuels the hose 158 will transport include, but are not limited to, kerosene, diesel fuel oil, and the like.

The hose 158 includes an arcuate portion 162, which is also referred to herein as a return curve 162. The return curve 162 is positioned on the forced-air heater 110 such that the return curve 162 is oriented similar to a "U" while the forced-air heater 110 is in its substantially-vertical storage orientation, with both arms aimed upwardly in a direction generally opposing the acceleration of gravity.

The location of the fuel inlet 148 through which liquid fuel can be inserted into the fuel tank 114 limits the amount of fuel that can be placed in the fuel tank 114. With the forced-air heater 110 in its firing orientation, the lowest point of the fuel inlet 148 marks the upper fuel level limit 150. Thus, the air gap 152a is disposed above the upper fuel level limit 150 and the liquid fuel in the fuel tank 114. When the forced-air heater 110 is transitioned to the substantially-vertical storage orientation shown in FIG. 8, the fuel in the fuel tank 114 shifts to position an air gap 152b adjacent to the fuel outlet 154. An example of a suitable size for the air gaps 152a, 152b is about 0.4 gallons with the fuel tank 114 at its maximum capacity, but air gaps 152a, 152b of any size is within the scope of the present invention.

The shifting of the fuel in the fuel tank 114 when the forced-air heater 110 is transitioned from the intended firing orientation to the substantially-vertical storage orientation creates a vacuum at the fuel outlet 154. The vacuum results in the siphoning of fuel from the hose 158 back into the fuel tank 114 instead of allowing the fuel to leak from the nozzle 160. Additionally, most, if not all of the remaining fuel not siphoned back into the fuel tank 114 is allowed to pool in the return curve 162 in the hose 158 instead of draining from the nozzle 160. This further minimizes leakage of the fuel from the forced-air heater 110.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. A heating system, comprising: a forced air heater, comprising:
   a combustion region;
   an interior chamber disposed adjacent to the combustion region;
   wherein the heater comprises a fuel inlet for coupling to an external fuel tank or a fixedly engaged fuel tank; and
   a control unit at least a portion of which is disposed inside the interior chamber adjacent the combustion region that selectively supplies electrical power to the heater from a first power source or second power source to control at least a portion of the heater; wherein:
   the first power source is in electrical communication with a selectively removable rechargeable battery; and
   the second power source is in electrical communication with remote power source, the second power source comprising an alternating current (AC) electrical power source supplied by an electrical outlet coupled to a source of AC electrical power.

2. The heating system of claim 1, comprising a fuel line to fluidly couple the fuel tank with the fuel inlet, the fuel tank comprising a pressurized hydrocarbon fuel used for combustion in the combustion region.

3. The heating system of claim 1, wherein the fuel tank is fixedly engaged to the heater and is configured for holding liquid fuel oil product used for combustion in the combustion region.

4. The heating system of claim 1, the first power source comprising a selectably removable lithium-based battery.

5. The heating system of claim 1, the forced-air heater comprising a power supply comprising an electrical coupling component that electrically couples the first power source to the control unit when the first power source is selectably engaged with the power supply).

6. The heating system of claim 1, comprising a recharging unit that recharges the selectably removable battery separately from the heater.

7. A forced-air heater, comprising:
   a combustion region;
   an interior chamber disposed adjacent to the combustion region;
   a fuel inlet for coupling to an external fuel tank or a fixedly engaged fuel tank; and
   a control unit at least a portion of which is disposed inside the interior chamber adjacent to the combustion region that selectively supplies electrical power to the heater from a first power source to control at least a portion of the heater; wherein:
   an electrical coupling component that electrically couples the first power source to the control unit when the first power source is in electrical communication with a selectively removable rechargeable battery and
   a second power source, the second power source comprising one of the following:
   a rechargeable lithium-based battery that is selectably removable; and
   an alternating current (AC) electrical power source supplied by an electrical outlet coupled to a source of AC electrical power.

8. The heater of claim 7 wherein the fixedly engaged fuel tank holds liquid fuel oil product used for combustion in the combustion region.

9. The heater of claim 7, the first power source selectably engaging with a separate recharging unit for recharging of the first power source.

10. A heater, comprising:
a combustion region;
a fuel assembly comprising a fixedly engaged fuel tank that holds liquid fuel;
an interior chamber disposed adjacent to the combustion region;
a control unit at least a portion of which is disposed inside the interior chamber adjacent to the combustion region to control at least a portion of the operation of the heater;
a first power source that supplies electrical power to the control unit, the first power source comprising a selectively removable rechargeable battery;
a second power source, the second power source comprising one of:
a rechargeable battery that is selectably removable; and
an alternating current (AC) electrical power source supplied by an electrical outlet coupled to a source of AC electrical power; and
an electrical coupling component that electrically couples the first power source to the control unit when the rechargeable battery is selectably engaged with the first power source.

11. The heater of claim 10, comprising a separate recharging unit that recharges the selectably removable battery separately from the heating device.

12. The heater of claim 10, the first power source comprising a selectably removable lithium-based battery.

13. The heater of claim 10, comprising a fuel delivery component that provides fuel from the fuel tank to the combustion region.

* * * * *